April 11, 1961 N. N. ESTES 2,979,015
ANTI-TORPEDO SYSTEM
Filed Jan. 6, 1944 13 Sheets-Sheet 8
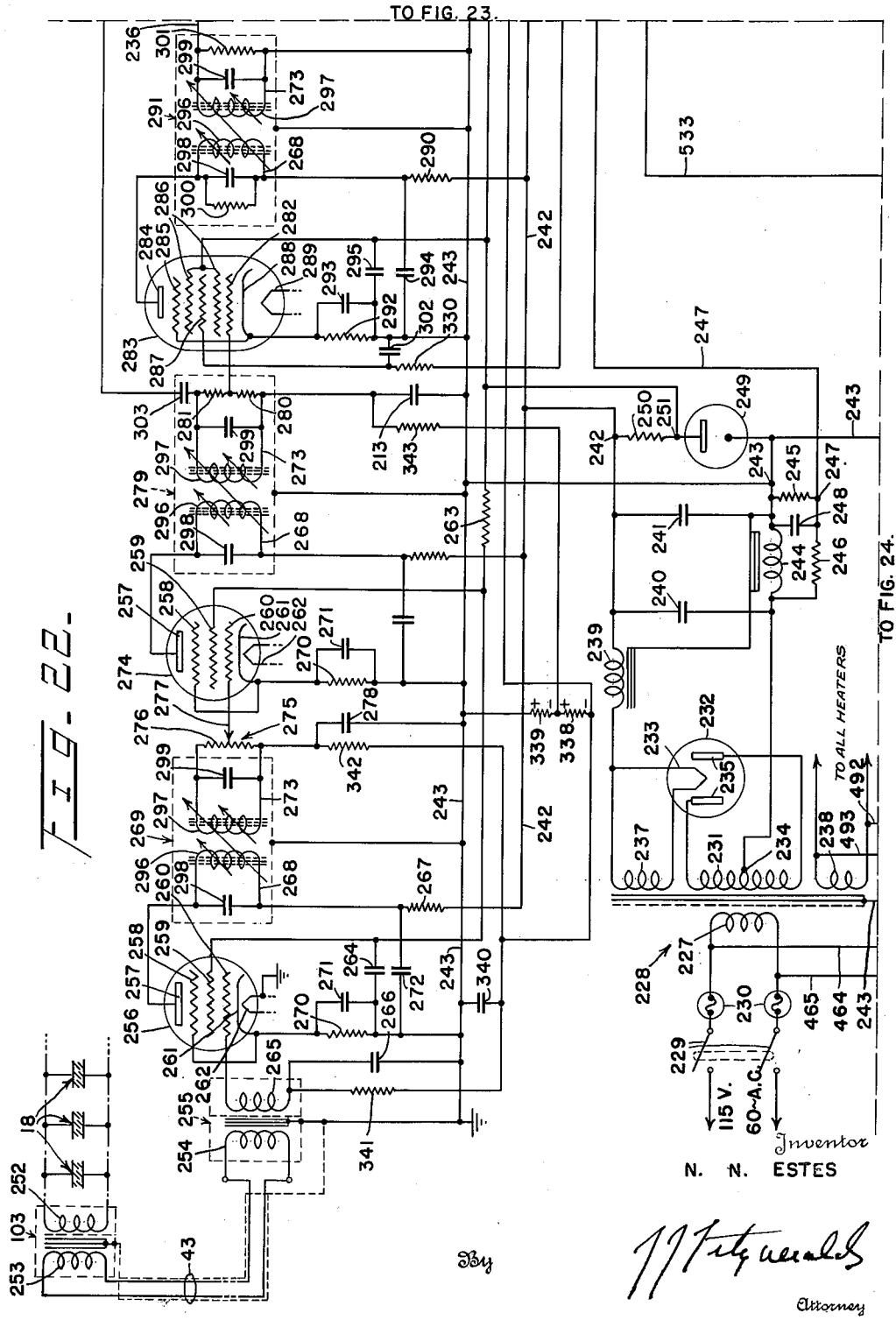

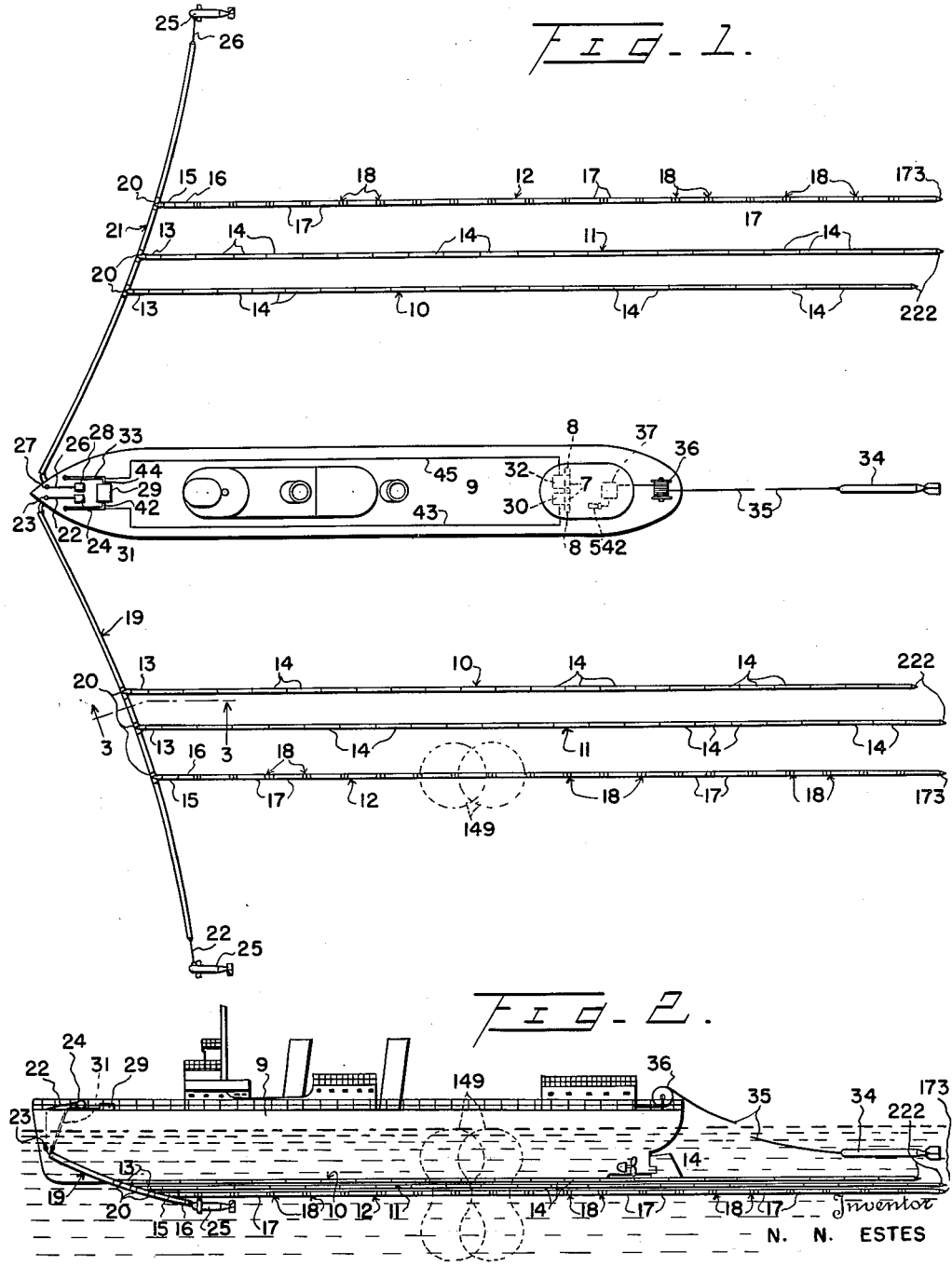

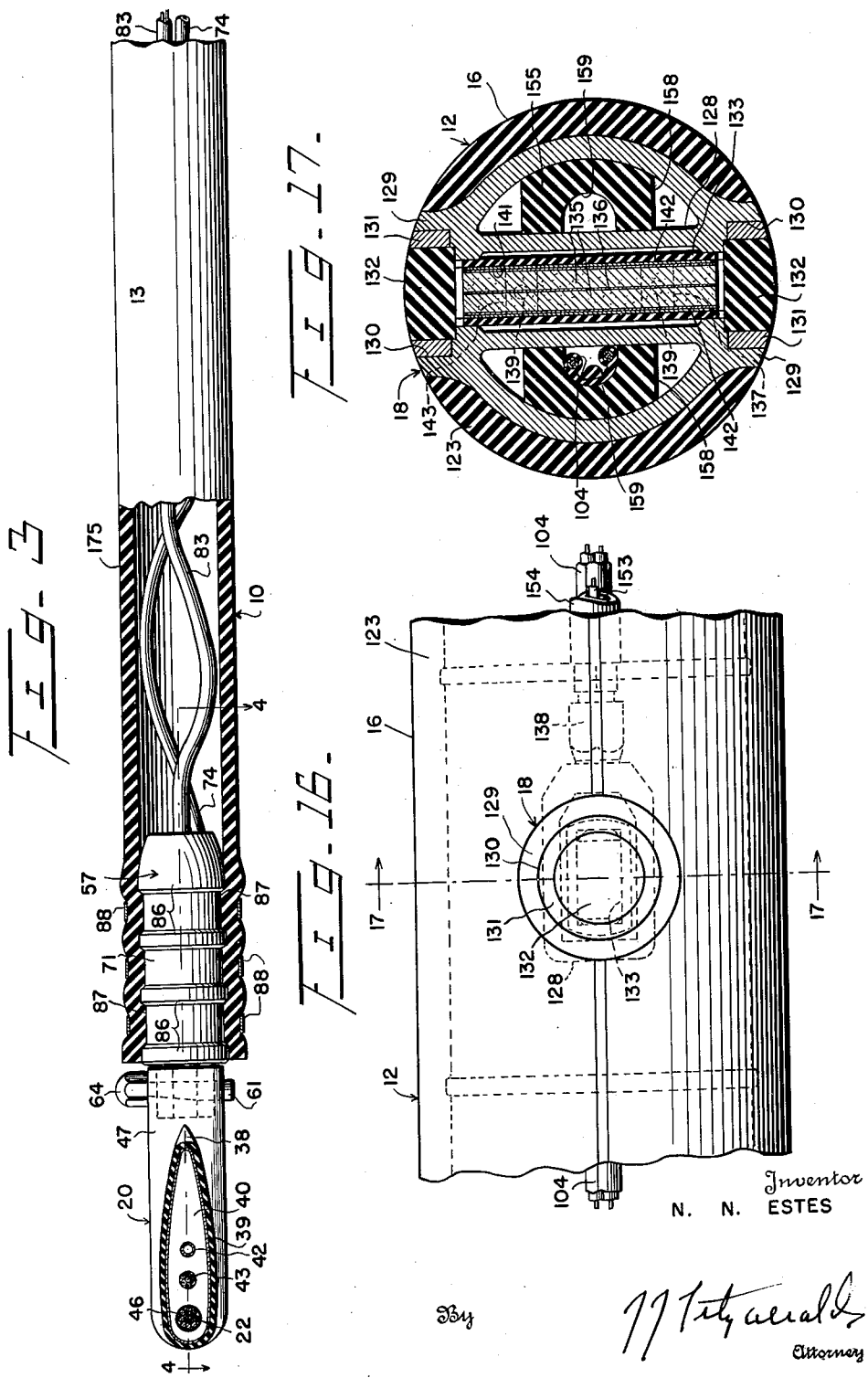

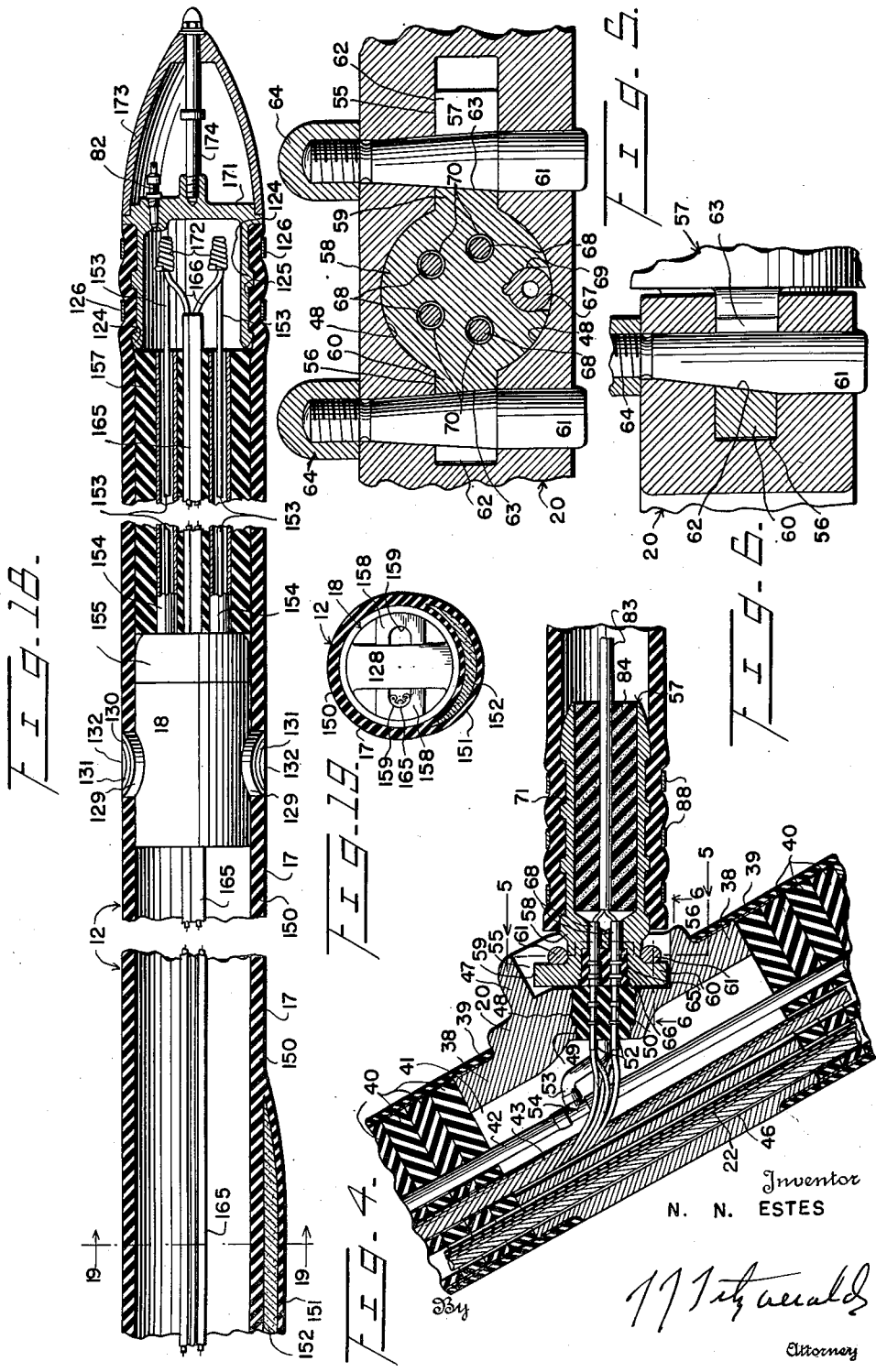

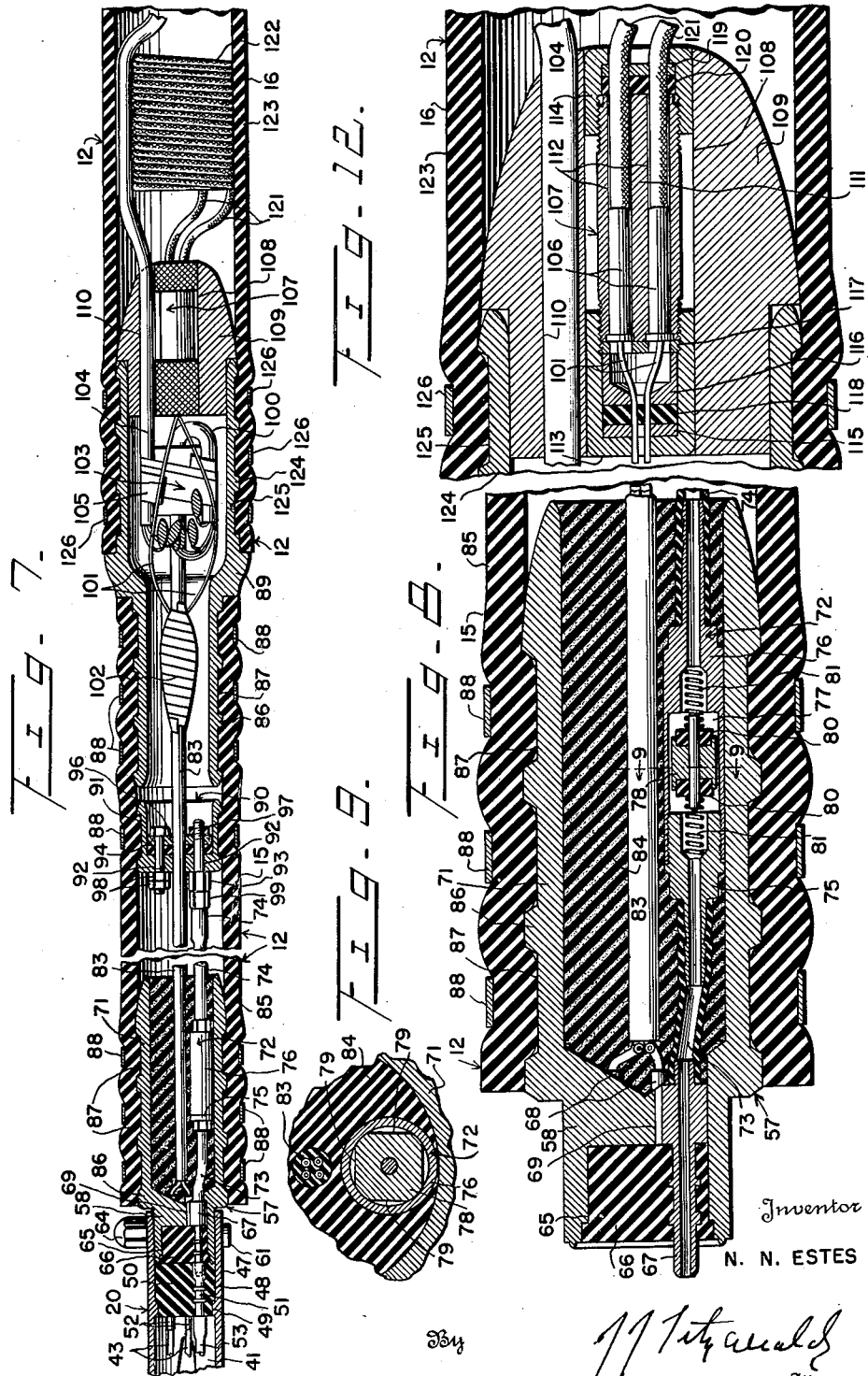

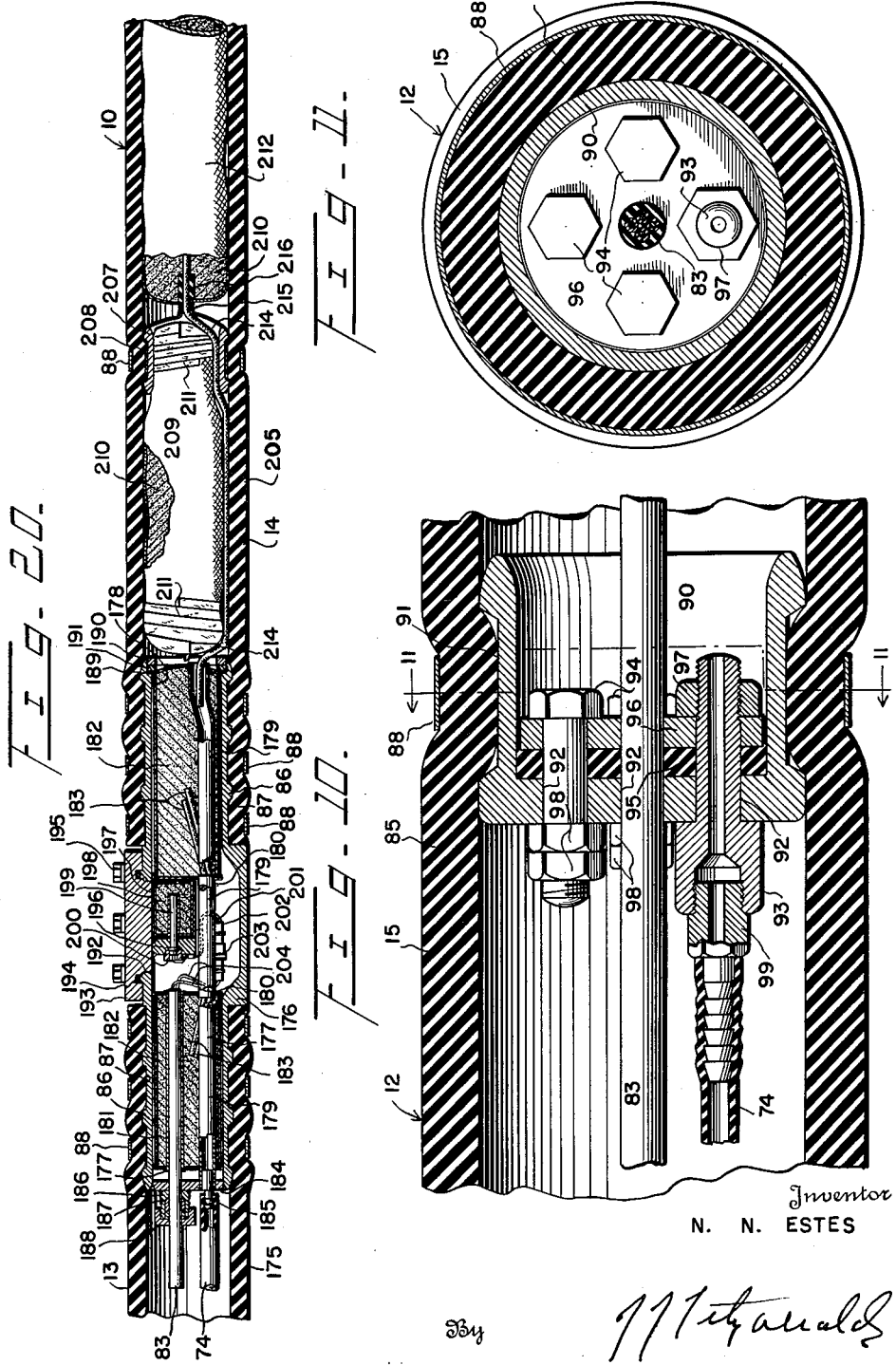

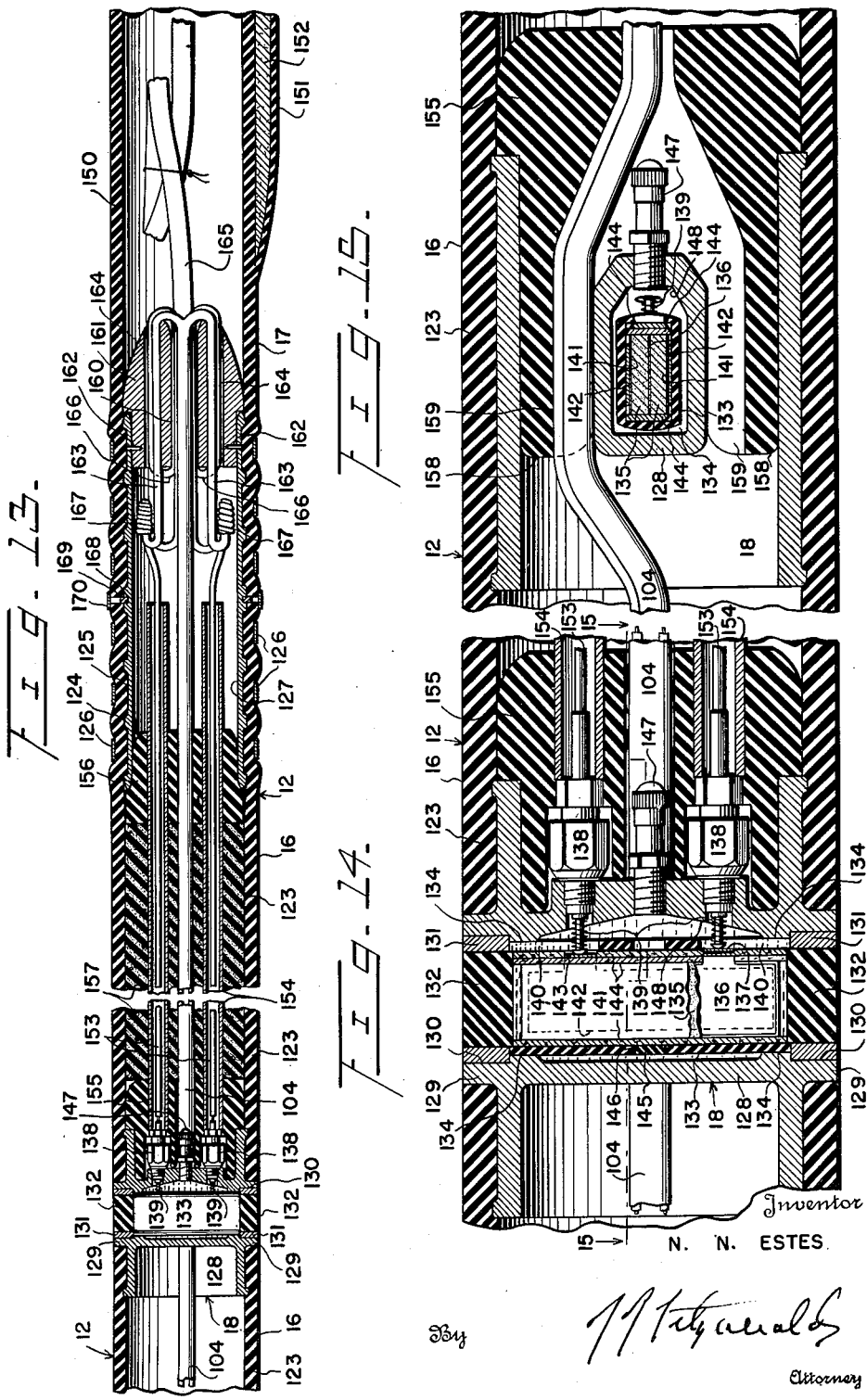

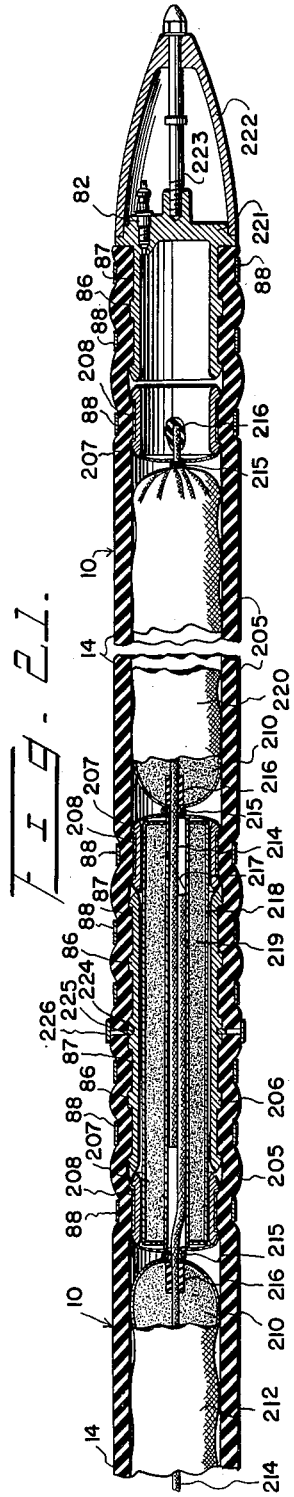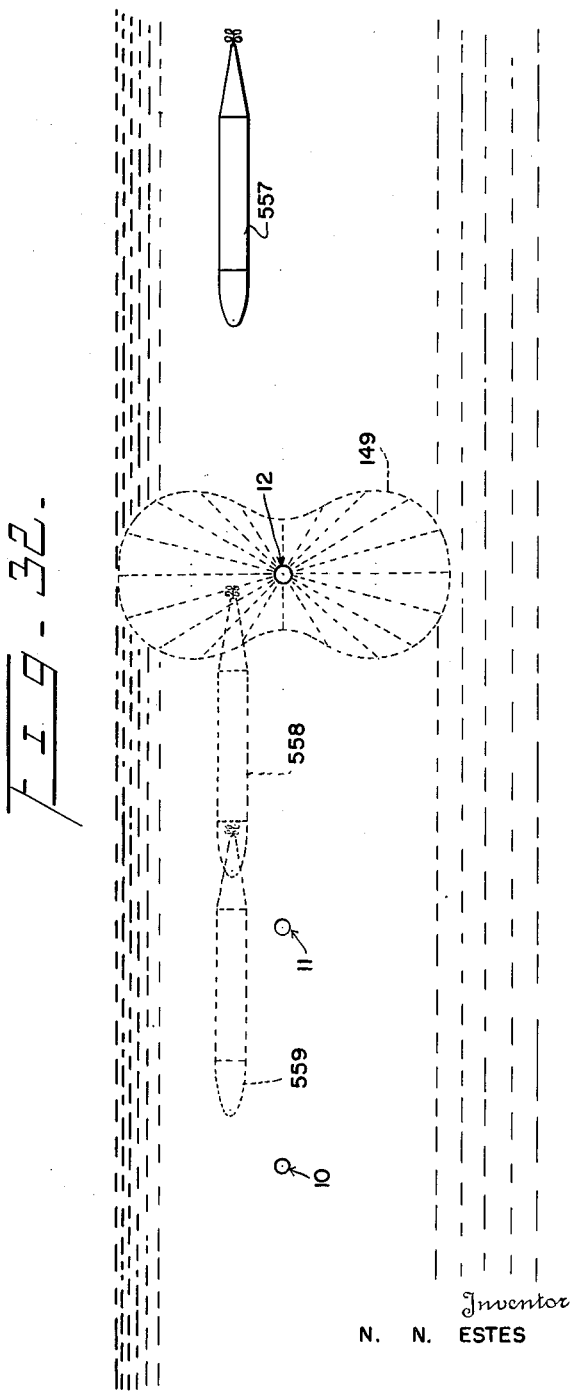

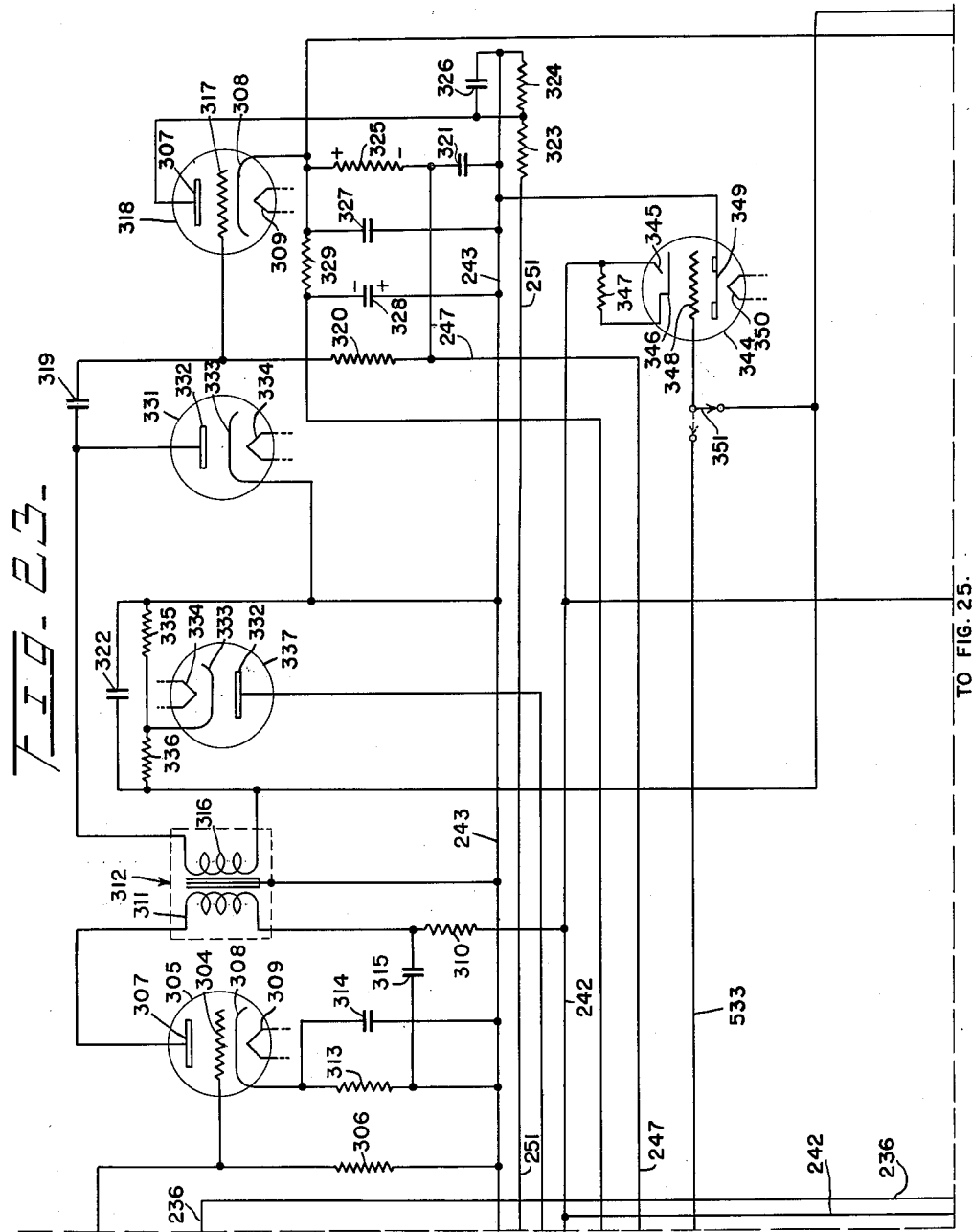

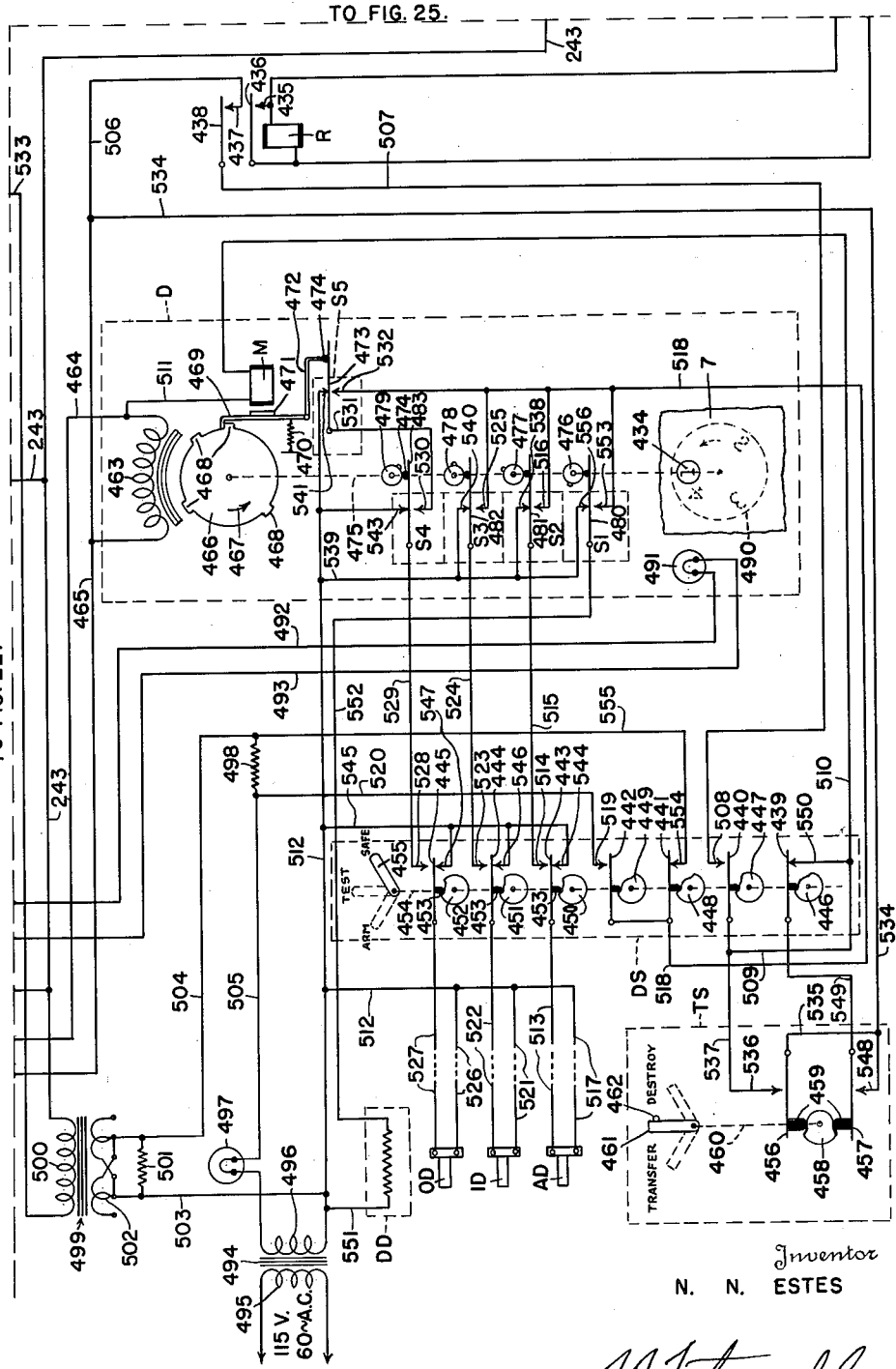

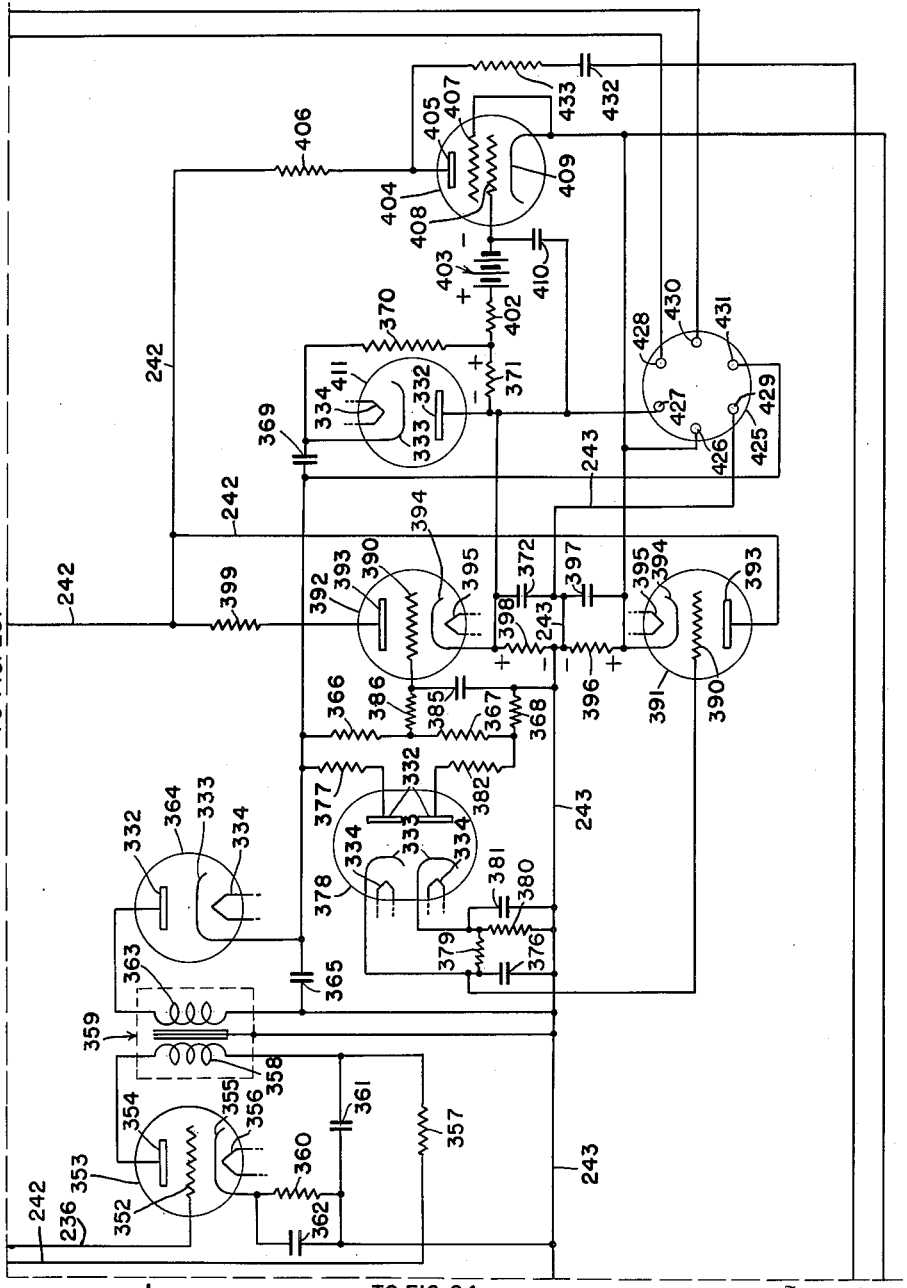

April 11, 1961  N. N. ESTES  2,979,015
ANTI-TORPEDO SYSTEM
Filed Jan. 6, 1944  13 Sheets-Sheet 13

| OPERATION OF SWITCH DS | | | |
|---|---|---|---|
| SWITCH POSITION | ARM | TEST | SAFE |
| CONTACT SPRING 439 | UP | DOWN | DOWN |
| CONTACT SPRING 440 | UP | UP | DOWN |
| CONTACT SPRING 441 | UP | DOWN | DOWN |
| CONTACT SPRING 442 | UP | DOWN | DOWN |
| CONTACT SPRING 443 | UP | UP | DOWN |
| CONTACT SPRING 444 | UP | UP | DOWN |
| CONTACT SPRING 445 | UP | UP | DOWN |

Inventor
N. N. ESTES
By
Attorney

United States Patent Office 2,979,015
Patented Apr. 11, 1961

2,979,015

ANTI-TORPEDO SYSTEM

Nelson N. Estes, Austin, Tex.

Filed Jan. 6, 1944, Ser. No. 517,201

23 Claims. (Cl. 114—240)

(Granted under Title 35, U.S. Code (1952), sec. 266)

This invention relates to anti-torpedo systems for the protection of vessels and more particularly to systems of the type in which means for detecting and destroying a moving torpedo are towed within the water by a vessel and the control means therefor is carried on the vessel for automatically operating the destroying means in response to a signal received from the detecting means whereby the torpedo upon approaching within the vicinity of the towed means is destroyed, disabled, or deflected thereby.

In anti-torpedo systems of this type, it heretofore has been proposed to employ a plurality of flexible tubes or streamers adapted to be towed by a moving vessel, one of such streamers being arranged at a distance on each side thereof, and maintained at a predetermined depth of submergence within the water. In accordance with such a system, each streamer has arranged therein an explosive charge and a plurality of microphonic devices disposed at intervals along the length thereof, the charge and each of such microphonic devices being maintained in operative electrical connection with a filter and amplifying device carried on the vessel. The filter and amplifying device is adapted to amplify only supersonic signals originated by the torpedo upon approaching within a predetermined distance of the microphonic devices and adapted to fire the explosive charge thereby to destroy the torpedo when the amplified signal has reached a predetermined degree of strength. Such a system, for example, is described and claimed in the copending application of James B. Glennon et al. for Anti-Torpedo Device, Serial No. 445,370, filed June 1, 1942, now Patent Number 2,941,493.

Although such a system may effectively damage or destroy an approaching torpedo, the system is not susceptible of such a high degree of control as invariably to cause firing of the explosive charge synchronously with the transit of the torpedo with respect thereto, for the reason that the system does not employ control means critically responsive to the specific character of the signal produced by a moving torpedo. The term transit, as employed herein, is defined as the instant of passage of a torpedo with respect to a reference point.

It has been observed that the sound signal of a torpedo, as the torpedo approaches and passes a microphone, gradually rises in intensity and reaches a maximum amplitude or peak value at the point of nearest approach thereto, and then diminishes in intensity when the torpedo has passed the microphone. It is obvious that, if the intensity of the received sound signal varied smoothly, the peak value thereof might serve as a simple expedient for controlling the firing of an explosive charge in accurate timed relation to the transit of the torpedo with respect thereto. However, it further has been observed, that the torpedo signal has superimposed thereon a series of modulations of much shorter duration than the principal signal and which modulations have peaks which sometimes are substantially equal to the principal peak in amplitude. Consequently, control means adapted to be actuated by the occurrence of a peak in the torpedo signal is subject to being actuated by the peak of one of the several modulations in the signal, which peak may occur at a time when the torpedo is outside the explosive damage range of the device. Moreover, it is obvious that the occurrence of sound variations productive of peaks of sufficient amplitudes such, for example, as peaks caused by countermine shocks, are equally capable of actuating a peak responsive control means thereby to produce a spurious firing of the explosive charge.

It also has been observed in microphonic devices heretofore employed with systems of this type that the changes of received intensity of the torpedo signal, introduced by the azimuthal variations of the sensitivity of the microphones, produce a signal effect in advance of the principal signal effect produced by the torpedo's propellers. This condition is particularly true of a torpedo passing the microphones at a relatively great distance above or below the same. Accordingly, in the prior systems, response of the control means to an advanced signal results in anticipatory firing of the explosive charge, which condition is compensated for by means of an interposed filter giving a time delay, thereby to prevent premature firing of the charge. However, in the case of the prior systems, when the microphones respond to the principal signal, in the case of a torpedo passing relatively near to the microphones, the time delay inherent in the filter and the control means is sufficient to cause firing of the charge far in arrears of the torpedo thereby only to urge it additionally onward toward its mission of destruction.

The system of the present invention is an improvement in the prior systems and devices of the type considered herein such, for example, as a system employing the anti-torpedo device disclosed and claimed in the aforesaid application of James B. Glennon et al., Serial No. 445,370, filed June 1, 1942, wherein the difficulties of the prior systems are obviated. The present arrangement comprises a plurality of streamers maintained in predetermined spaced relation within the water and arranged on each side of a moving vessel and towed thereby at a predetermined depth of submergence, the microphonic devices being arranged in streamers separate from the streamers carrying the explosive charge. The outboard streamer on each side of the vessel, hereinafter referred to as an acoustic or detection streamer, has a plurality of microphonic devices integrally formed therein and disposed at intervals along the length thereof, and each of the remaining, or explosive streamers, has arranged therein an explosive charge which extends substantially along the entire length of each of the streamers.

A pair of control mechanisms is carried on the vessel, each of the mechanisms being controlled by signals received from an associated acoustic streamer, and each control mechanism being adapted either automatically to fire in succession the explosive streamers associated therewith as successive signals are received from the acoustic streamer, or to enable such firing of the streamers to be accomplished manually and selectively at will.

Each microphone unit employed with the detection streamers is designed to provide a smooth response pattern which is substantially in the form of a vertical dumbbell of sufficient size to produce an overlapping of the response patterns of adjacent microphone units thereby to render the acoustic streamer substantially uniformly responsive to signals received from a torpedo passing above or below the same at any point along the length of the streamer. Furthermore, the vertical dumbbell response patterns, being free of extreme azimuthal variations, provide a maximum sensitivity for the microphones in a vertical direction, which direction is substantially maintained throughout the length of the streamer by the addition thereto of suitable material adapted to be influenced by gravity in a manner to produce the desired orientation of the streamer. The dumbbell pattern gives the maximum sensitivity in a vertical plane above and below the streamer and causes the signal intensity from the torpedo to increase more rapidly as the torpedo passes through the vertical plane of the acoustic streamer, thereby substantially reducing variations in the electrical output of the streamer prior to the transit of the torpedo with respect thereto. The construction of the microphone units also renders the same responsive to a frequency suitable for the purpose such, for example, as a frequency substantially within the range of 47 to 55 kilocycles per second.

Accordingly, by the use of directionally supported microphone units of the above described type, a closely defined relation is established between the transit of the torpedo with respect to the acoustic streamer and the maximum response sensitivity of the microphone units thereby to provide a datum point from which accurately to time the selective firing of a plurality of explosive streamers disposed at different distances beyond the microphone streamer in the path of travel of the torpedo.

The frequency range of 47 to 55 kilocycles is well adapted for operation of an acoustically responsive anti-torpedo device of the type disclosed herein since the discrimination of the dumbbell pattern of the microphones against ship noise with respect to the transit torpedo noise substantially obviates the danger of spurious response of the device to the noise of the vessel.

In this frequency range, the average sound level or signal of a torpedo approaching and passing the microphone units rises sharply to a maximum or peak value and then falls off sharply as the torpedo's propellers pass the microphone units. Superimposed upon this signal are a series of fluctuations or modulations which increase progressively in intensity until the torpedo passes the microphone units after which the fluctuations in the torpedo signal sharply and progressively decrease in intensity. A series of peaks in the torpedo signal is thus formed in which the peak values of the signal increase progressively until the principal peak is reached, after which the succeeding peaks decrease sharply and progressively in value. The sharp rise, amplitude, sharp decline, and modulation of the signal are properties thereof to which the control mechanism is particularly adapted to respond in a predetermined manner to cause firing of an explosive streamer.

Each control mechanism includes a band pass amplifier adapted to amplify signals within the above mentioned frequency band of 47 to 55 kilocycles per second. The amplifier includes a normally closed electronic gate controlled by a squelch circuit which is adapted initially to close the gate thereby to prevent signals from passing to the last stage of amplification and which is operative to open the gate and pass the signals if the same persist for more than approximately one quarter of a second, thereby to prevent fast transients, such as the signals produced by countermine shocks, from reaching the last stage of amplification.

Each control mechanism also includes an automatic gain control adapted to level off signals of strong intensity whereby the amplifier may respond to a wide range of signal values and, not withstanding the wide range of the signals applied to the amplifier, provide signal amplification within an operable working range. In addition to the leveling action, the automatic gain control provides a novel feature adapted to retain the initial characteristic incremental shape of a torpedo signal of high intensity regardless of the leveling action thereon. The term "incremental shape" as employed herein may be defined as the shape of the envelope of the sound signal as may be made manifest by the rectified electrical signal corresponding thereto, as will be more clearly apparent as the description proceeds.

The control mechanism further includes a circuit network, hereinafter referred to as a discriminator circuit, adapted to follow the gradual rise or upward trend in the amplified signal without responding to the series of relatively short negative excursions therein. When the amplified signal has reached or exceeded a predetermined amplitude and thereafter declines sharply, the discriminator circuit is effective independently of the remaining portion of the signal, save for the necessary effect produced by the fluctuations therein, to actuate a firing relay in control of a timing distributor device for selectively closing a plurality of firing circuits thereby to fire a selected explosive streamer, as will more clearly appear as the description proceeds. Thus, the discriminator circuit is effective to cause the relay to be operated when the amplified signal is of sufficient amplitude, sharply declines after reaching the maximum peak value, and has modulations therein characteristic of a torpedo and thereby prevents the operation of the relay in response to those signals which do not embody these characteristic properties of the torpedo signal.

The firing circuits associated with each firing control mechanism are also adapted to be controlled by a switch mechanism comprising a plurality of switch elements settable at will to various positions for the purpose of either arming, testing or rendering the firing circuits ineffective, as the case may be. Another switch mechanism is provided to cooperate in one position thereof with both the timing distributor and the switch elements of the first named switch mechanism to transfer an indicating device from the detonator in a selected explosive streamer to a dummy detonator for comparison of the firing circuit including the detonator with the circuit including the dummy detonator thereby to ascertain the condition of the firing circuit including the detonator, and in another position to cause detonation of the explosive in a selected streamer, including the acoustic streamer, for the purpose of destroying the streamer in the event that it has been damaged and is likely to foul the propellers of the vessel or when it is deemed necessary to destroy the apparatus to prevent it from falling into the hands of an enemy.

A broad object of the present invention is to provide an anti-torpedo system of the type disclosed which possesses all of the qualities of ruggedness and durability, is relatively economical to manufacture, is reliable and consistent in operation, and which provides a high degree of protection against a torpedo attack.

Another broad object of this invention is to provide new and improved means for detecting the approach of the torpedo and for firing an explosive charge adjacent the torpedo after the same has passed the detecting means.

Another object is to provide new and improved means for analyzing the torpedo signal received through the water and for firing a plurality of explosive charges arranged in the path of travel of the torpedo selectively under control of the analyzing means.

Another object of the invention is the provision of an anti-torpedo system in which the means for detecting the approaching torpedo is arranged in the path of travel thereof in advance of the means for destroying the torpedo whereby the destroying means is operated in predetermined timed relation to the transit of the torpedo with respect thereto.

Another object of the invention is to provide an anti-torpedo system of the class described in which at least one explosive streamer may be fired in predetermined time delayed relation to the transit of the torpedo with respect to an acoustic streamer which is arranged a predetermined distance in advance of the explosive streamer in the path of travel of the torpedo.

Another object of the invention is the provision, in an anti-torpedo system of the class described, of an acoustic streamer and a separate explosive streamer controlled thereby in which the maximum response sensitivity of the acoustic streamer is closely related to the transit of the torpedo with respect thereto and the relation thus established is employed for timing the firing of the explosive streamer.

A further object of the present invention is the provision, in an anti-torpedo system of the type considered herein, of a control mechanism in operative electrical connection with an acoustic streamer and at least one explosive streamer associated therewith in which the control mechanism is adapted to respond to each of a plurality of different properties of an electrically simulated torpedo signal generated by the acoustic streamer in response to a moving torpedo and in which the control mechanism is adapted, upon response thereof in a predetermined manner to all of said properties, to fire a selected explosive streamer.

A further object is the provision of a control mechanism which is effective to fire an explosive streamer upon response to a torpedo signal of predetermined character in which means are included for rendering the mechanism ineffective to fire the streamer in response to fast transient signals and other signals of predetermined character such as those produced by a vessel or by a countermine shock.

An additional object is to provide a new and improved control mechanism which is responsive to signals over a wide range of intensity and in which the signals of high intensity received by the mechanism are leveled-off without effectively impairing the incremental shape of such signals.

A still further object is to provide a control mechanism which includes a timing distributor device adapted to move and close a selected one of a plurality of firing circuits in time delayed relation to the actuation of the distributor in which the distributor subsequently moves into a position for closing another of the circuits upon further actuation thereof.

Still other objects of the present invention are those inherent in the novel construction, combination, and arrangement of parts which will become manifest upon examination of the following specification, reference being had to the accompanying drawings wherein:

Fig. 1 shows in diagrammatic form a complete system and the response patterns of the acoustic streamers employed therewith according to a preferred embodiment of the invention;

Fig. 2 is a view in elevation of the arrangement shown in Fig. 1;

Fig. 3 is an enlarged view in elevation of one of the inboard streamers substantially as viewed along the line 3—3 of Fig. 1, certain parts being shown in section and partly broken away more clearly to illustrate the structure;

Fig. 4 is a sectional view taken along the line 4—4 of Fig. 3;

Fig. 5 is a sectional view somewhat enlarged taken along the line 5—5 of Fig. 4;

Fig. 6 is a sectional view of the same proportions as Fig. 5 taken along the line 6—6 of Fig. 4;

Fig. 7 is a fragmentary vertical sectional view of the forward portion of the acoustic streamer taken substantially along the center thereof;

Fig. 8 is an enlarged vertical sectional view of the end portion of the streamer shown in Fig. 7 with the coupling removed;

Fig. 9 is a fragmentary sectional view of the flutter valve taken along the line 9—9 of Fig. 8;

Fig. 10 is an enlarged sectional view of the bulkhead shown in Fig. 7;

Fig. 11 is a sectional view taken along the line 11—11 of Fig. 10;

Fig. 12 is an enlarged vertical sectional view showing the detonator assembly of Fig. 7;

Fig. 13 is a fragmentary vertical sectional view of the short acoustic section and the standard acoustic section attached thereto taken substantially through the center thereof;

Fig. 14 is an enlarged view in section of the microphone unit shown in Fig. 13;

Fig. 15 is a sectional view taken along the line 15—15 of Fig. 14;

Fig. 16 is an enlarged plan view of a portion of the acoustic streamer containing the microphone unit;

Fig. 17 is a sectional view taken along the line 17—17 of Fig. 16;

Fig. 18 is a vertical sectional view partly broken away of the tail portion of the acoustic streamer taken substantially along the center thereof;

Fig. 19 is a sectional view taken along the line 19—19 of Fig. 18;

Fig. 20 is a fragmentary vertical sectional view of a section of an explosive streamer taken substantially along the center thereof;

Fig. 21 is a vertical sectional view partly broken away of the last two sections of an explosive streamer taken substantially along the center thereof;

Figs. 22 through 25 illustrate in diagrammatic form the electrical system according to a preferred embodiment of the invention;

Fig. 26 is a diagram showing the arrangement of the various sheets comprising the electrical system;

Figure 27:
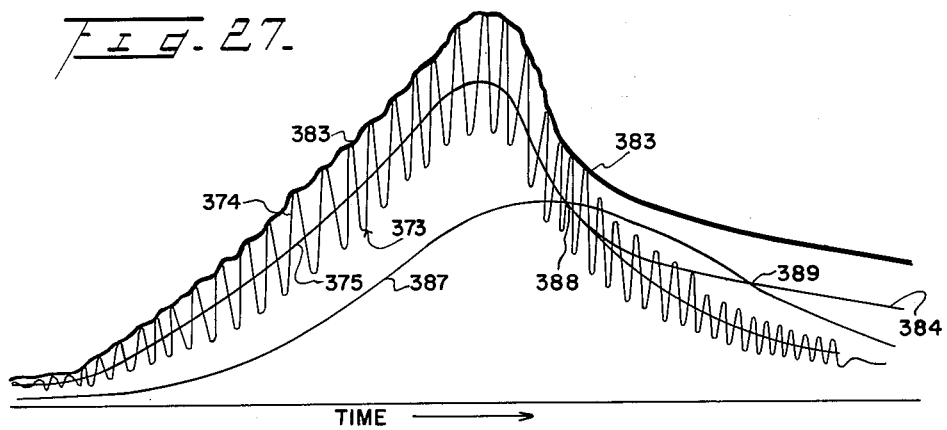
Fig. 27 illustrates graphically variations in voltage at several different portions of the discriminating circuit network caused by a torpedo signal.

Referring now to the drawings in which like reference characters are used to designate like or similar parts, and more particularly to Figs. 1 and 2 thereof, there is shown thereon in diagrammatic form, a vessel indicated generally by the numeral 9. Laterally disposed on each side of the vessel is a pair of spaced explosive streamers generally designated by the numerals 10 and 11 and an acoustic or detection streamer disposed outwardly therefrom and generally designated by the numeral 12.

Each explosive streamer includes in the forward portion thereof a leading or buffer section 13 and a plurality of standard sections 14 coupled end to end to form a single streamer and, as will appear more clearly hereinafter each explosive streamer contains a plurality of explosive charges arranged substantially throughout the length thereof and an electroresponsive device adapted to fire the explosive charges. Each acoustic streamer includes a buffer section 15 generally similar to the buffer section 13 of the explosive streamer, a short intermediate section 16, and a plurality of standard sections 17 coupled end to end to form a single streamer. The short section 16 and each of the standard sections have integrally molded therein near the trailing end thereof a microphone unit generally designated by the numeral 18. Except for the buffer section thereof, each streamer is maintained in an inflated condition by air pressure thereby to render the streamers neutrally buoyant when the same are disposed at a predetermined depth of submergence within the water.

The streamers on the port side of the vessel, for example, are maintained in spaced relation therewith and with respect to each other and at the predetermined depth of submergence within the water by a towing cable generally designated by the numeral 19, each streamer being connected to a coupling 20 individual thereto and forming a part of the towing cable. The towing cable may be of any suitable type but is preferably of the type disclosed in the copending application of Harold W. Klas, for Faired Towing Means for Anti-Torpedo Device, Serial No. 483,105, filed April 15, 1943, now Patent No. 2,668,-512, issued February 9, 1954. Suffice it to state herein that the towing cable is secured to a tow line 22 which extends through a tube 23 and is secured to any suitable device for paying out the cable such, for example, as the winch mechanism 24. The other end of the tow line 22 is secured to a paravane 25 adapted to maintain the towing cable at a wide angle with respect to the vessel and at the desired depth of submergence within the water, substantially as shown.

In like manner the streamers on the starboard side of the vessel are maintained in spaced relation therewith and with respect to each other and at the predetermined depth of submergence within the water by means of a towing cable generally designated by the numeral 21, the cable 21 being generally similar to towing cable 19. Each streamer is connected to a coupling 20 individual thereto and forming a part of the cable 21. The towing cable 21 similarly is secured to a tow line 26 the inner end of which extends through a tube 27 to a winch mechanism 28 and the other end of which is secured to a paravane 25.

The tow cable 19 also serves as a pneumatic and electrical supply line for the streamers secured thereto for connecting the same to a source of air pressure 29 and an electrical control mechanism 30 carried on the vessel, a tube 31 being employed to continue the supply line from the towing cable to a point on board the vessel and the couplings 20 serving to provide the necessary pneumatic and electrical connections to the streamers when the same are mechanically secured thereto. In like manner the cable 21 serves as a supply line for connecting the streamers attached thereto to the source of air pressure 29 and to an electrical control mechanism 32 which may be identical with the control mechanism 30, a tube 33 serving to continue the supply line from the cable 21 to a point on board the vessel. The control mechanisms 30, 32 may each be supported on a suitable panel or housing 7 therefor, and the panels may be identical for interchangeable mounting in a common cabinet or rack 8 therefor. It will be understood that the equipment on the starboard side of the vessel is substantially identical to that on the port side of the vessel. Accordingly, further description of the system appearing hereinafter will refer to the equipment on the port side of the vessel except where specific reference is made to that on the starboard side.

In addition to the foregoing system there is also provided for use therewith a hydrophone device 34 adapted to be towed within the water at a sufficient distance behind the vessel so as to be effectively outside the range of sonic sounds developed by the vessel. The hydrophone has arranged therein a plurality of microphonic devices, not shown, which may be disposed, in a manner to render the hydrophone generally responsive to sonic signals such, for example, as those produced by the launching and propulsion of a torpedo originating within an area of approximately one mile radius.

The hydrophone is towed behind the vessel by means of a cable 35 which is secured on the vessel to a suitable means for paying out the hydrophone such, for example, as a reel 36. The tow cable 35 also serves as an electrical supply line for connecting the microphonic devices within the hydrophone 34 to an amplifier 37 whereby the signals may be amplified sufficiently to operate a loud speaker 542. Accordingly, an operator in attendance at the loud speaker, upon hearing a signal indicative of the launching or running of a torpedo, may arm the dual system comprising the electrical control mechanisms 30, 32 thereby to render the system automatically effective to detect and destroy the torpedo as it approaches within the vicinity of the vessel.

Referring now to Figs. 3 thru 7 in which a coupling 20 is shown in greater detail, it will be seen that the coupling is generally of tubular configuration having end portions 38 of faired cross section to which faired sheaths 39 are secured. The sheaths 39 may be of any material suitable for the purpose such, for example, as rubber or rubber coated fabric, it being understood that the sheaths extend to adjacent coupling members 20 and that a plurality of spacing members 40 are inserted within the sheaths adjacent to the ends of each coupling member as shown in Fig. 4.

Extending thru the chamber 41 within the coupling 20 is an air line 42 which is connected to the air pressure supply 29 and a plurality of conductors 43 which are in electrical communication with the control mechanism 30, Fig. 1. It will be understood that the tow cable 21 likewise has extending therethrough an air line 44, Fig. 1, connected to the air pressure supply 29 and a plurality of conductors 45 which are connected to the electrical control mechanism 32. Each coupling 20 also has a longitudinal bore 46 thru which extends the tow line 22, it being understood that the tow line 26 is extended thru the tow cable 21 in like manner. It will be further understood that the spacing members 40 have suitable openings therethru for receiving the air line, conductors, and tow line and serve thereby to maintain the same in spaced relation within the sheaths.

Each of the couplings 20 is provided with a rearward projection 47, Figs. 4 and 7, which extends generally parallel to the course of the vessel. The projection has a bore 48 which communicates with the chamber 41, the inner end of the bore being reduced at 49 to serve as a seat for a plug 50 which is inserted within the bore. The plug 50 may be of any suitable material such, for example, as hard rubber having embedded therein an air fitting 51, Fig. 7, and a plurality of terminal prongs 52. The fitting 51 is connected to the air line 42 by means of a flexible tube 53 one end of which is secured to the fitting and the other to a T connector 54 inserted into the air line. Each of the terminal prongs 52 is secured as by soldering to one of the plurality of conductors 43. The wall of the bore 48 is provided with diametrically arranged slots or grooves 55 and 56, Fig. 5, which extend inwardly along the bore to a point slightly beyond the plug 50, the opening provided by the bore and slots being adapted interfittingly to receive a towing head generally designated by the number 57.

Referring now to Figs. 3 thru 9 in which the towing head is shown in greater detail, it will be seen that the towing head has a cylindrical portion 58 and projections 59 and 60 laterally extended therefrom which conform to the bore 48 and grooves 55 and 56 respectively of the coupling 20. The projections 59 and 60 are partially cut away to receive a pair of tapered and threaded pins 61 carried by the coupling 20, the cut surfaces 62 and 63 being inclined to conform to the taper in the bolts. Thus, when the towing head is inserted into the opening in the projection 47 of the coupling 20 and the pins 61 are drawn up tight into the position shown on Figs. 5 and 6 by means of the nuts 64, the towing head is forced into watertight connection with the plug 48 and secured in locked relation with the coupling 20.

The cylindrical portion 58 is provided with a bore 65 which generally extends in alignment with the bore 48 of the projection 47. Inserted within the bore 65 is a plug 66 which may be of hard rubber, for example, having embedded therein an air fitting 67 and a plurality of terminal prongs 68 adapted to be received interfittingly by the fitting 51 and the plurality of prongs 52 respectively when the towing head is locked to the coupling as shown in Figs. 4 and 7. The fitting 67 and the terminal prongs 68 extend thru an opening 69 and a plurality of openings 70 respectively in the cylindrical portion 58 into the tubular portion 71 of the towing head in which a flutter valve generally designated by the numeral 72 is located, Figs. 7 to 9, the fitting 67 having an enlarged portion and offset which conforms to the aperture 69 whereby the fitting is held against rotation therein.

The flutter valve is connected on one end to the fitting 67 by means of a flexible tube 73 and is connected on the other end to a flexible tube 74 which extends outwardly of the towing head. The check valve includes a pair of tubular members 75 and 76 which when screwed together as shown in Fig. 8 provide a chamber 77 in which is located a piston 78. The piston 78 has flattened sides 79, Fig. 9, which permit a limited passage of air between the ends of the chamber, and carries on each end thereof a washer 80 of suitable gasket material adapted to seal the ends of the chamber when the piston moves to bring the sealing washers into engagement therewith. The piston is normally maintained in a position intermediate the ends of the chamber, as shown, by a pair of opposed springs 81 which conveniently may be seated with respect to the piston and the members 75 and 76 in the manner shown. This position of the piston is maintained as long as the difference in pressure in the ends of the chamber does not exceed a predetermined value such, for example, as approximately 8 pounds per square inch. However, when the pressure at the source 29 is less than that in the streamer by an amount in excess of the predetermined differential pressure, the piston moves forwardly to seal the chamber thereby to prevent a decrease in pressure in the streamer. When the pressure at the source 29 exceeds that in the streamer by an amount in excess of the stated differential such as occurs when the streamer is inflated too rapidly or when the streamer is torn away at some point below the check valve thereby releasing the pressure in the streamer, the piston moves rearwardly thereby to seal the chamber and prevent further flow of air therethru. If it is desired to inflate the streamers rapidly while the same are still on board the vessel, this may be accomplished by forcing air through the conventional check valve 82 which is carried by the tail plug in the end of each streamer, Figs. 18 and 21.

The conductors of a cable 83 are secured to the prongs 68 as by soldering, the cable being extended outwardly of the towing head along with the tube 74. The cable 83 and the flutter valve 72 are maintained in fixed position within the towing head by means of a plastic compound 84 which may be of any material suitable for the purpose such, for example, as a plastic compound well known in the art as ozite. The compound, by reason of its sealing qualities, serves as an added protection to prevent the admission of water into the streamers.

Referring now to Fig. 7 and Figs. 10 thru 19 in which an acoustic streamer 12 is shown and in particular to Fig. 7, it will be seen that the buffer section 15 of each acoustic streamer includes a length of hose 85 which may be of any material suitable for the purpose such, for example, as rubber or rubber coated fabric. The forward end of the hose 85 is secured to a towing head 57, the tubular portion thereof having a series of lands 86 and valleys 87 to which the hose is clamped in watertight relation therewith by means of suitable clamping devices 88. The other end of the hose 85 is similarly secured to the small tubular end of a reducer coupling 89.

Disposed within the hose adjacent to the coupling 89 is a cup-shaped bulkhead generally designated by the numeral 90 and having a valley 91 to which the hose 85 is clamped in watertight and airtight relation therewith by means of a clamping device 88. The bulkhead serves to prevent any water which might leak into the buffer section from reaching the other sections of the streamer, and also serves to render the portion of the streamer between the towing head and the bulkhead somewhat more flexible than the rest of the streamer inasmuch as this portion of the streamer is not inflated.

The bulkhead, Figs. 10 and 11, has a plurality of apertures 92 through which an air fitting 93, the cable 83, and a plurality of bolts 94 are extended. Disposed within the cup of the bulkhead is a packing washer 95 of any suitable gasket material and a metal washer 96 having holes therein in matching relation with the plurality of holes 92 in the bulkhead for accommodating the fitting 93, cable 83 and bolts 94. This arrangement serves as a stuffing box for sealing the bottom of the cup of the bulkhead when the nuts 97 and 98 for the fitting and bolts respectively are tightened sufficiently to compress the packing 65. The fitting 93 includes a coupling member 99 to which the flexible tubing 74 is connected thus completing the air line between the air supply 29 and the streamer.

The cable 83 is bared and a multi-conductor cable 100 and a pair of two conductor cables 101 are spliced thereto, the splice being first covered with a number of layers of rubber tape, not shown, which renders the splice airtight and prevents a splitting of the insulation which might otherwise occur by reason of the air pressure within the streamer. The splice is further covered with a convenient number of layers of friction tape 102 as shown in Fig. 7.

Located within the enlarged end portion of the coupling 89 is a step-down transformer generally designated by the numeral 103. The conductors of the cable 100 are secured as by soldering to the secondary terminals of the transformer and the conductors of a two conductor tape 104, well known in the art as electrotrim wire, are secured as by soldering to the primary terminals of the transformer. The transformer and cables secured thereto are bound as shown with a number of layers of soft paper and tape 105 thereby to cushion the transformer within the coupling.

The cables 101 are connected to a pair of detonators 106, Fig. 12, which are mounted in a detonator holder generally designated by the numeral 107. The detonator holder is inserted into the axial bore 108 of a plug 109 which, in turn, is inserted into the large tubular end portion of the coupling 89. The holder 107 comprises a tubular member 111 having longitudinal bores 112 which contain the detonators 106. The member 111 is threaded on the ends thereof to receive a pair of cup shaped members 113 and 114, the outer surfaces of which are preferably knurled in order to secure the holder 107 within the plug 109. The cup member 113 contains a number of spacing members 115, 116, 117 and a packing washer 118 which serve to lock the detonators within the holder and maintain the cables 101 is fixed position when the coupling 13 is screwed to the member 111. Similarly the cup member 114 contains a spacing washer 119 and a packing washer 120 which serve to hold the ends 121 of a coil of detonator fuse such, for example, as a fuse well known in the art as primacord, within the bores 112 in abutting relation to the detonators when the cup 114 is screwed onto the member 111. The coil 122, when fired by the detonators 106, is capable of explosive damage sufficient to blow away the streamer in the vicinity of the coil.

The coil 122 is disposed within a length of hose 123 forming a part of the short acoustic section 16. The hose 123 may be of material similar to that of the hose 85 of the buffer section and is similarly secured to the large tubular end of the reducer coupling 89 which also has a series of lands 124 and valleys 125 to which the hose is clamped in water and airtight relation therewith by means of the clamping devices 126. The other end of the hose 123 is similarly secured to a coupling 127, Fig. 13.

A microphone unit 18 comprising a casting of substantially tubular configuration is integrally molded in the hose 123 at a point relatively near the trailing end thereof. The casting includes a vertical diametrically extending tubular portion 128 substantially of rectangular cross section. In alinement with the portion 128 and exterior of the casting are diametrically opposed flanges 129 which extend to the outer surface of the hose in flushed relation therewith. Each flange 129 has a bore 130 concentric therewith which communicates with the interior of the tubular portion 128. A ring 131 adapted to be received into each bore 129 in pressed relation therewith contains a plug or window 132 of material suitable for the purpose such, for example, as rubber having the same acoustic impedance as sea water. The plugs may be formed in the rings in any convenient manner, preferably by being molded therein.

Located within the chamber provided by the portion 128 and the plugs 132 is a shell 133 which may be molded of any suitable plastic such as Bakelite. The shell is snugly held within this chamber by a reduction in the internal cross section of the portion 128 at 134 which conforms to the periphery of the shell. Disposed within the shell is a microphone comprising a pair of salt crystals 135 which preferably are of the type known in the art as Rochelle salt crystals. The crystals are cemented together with an electrode 136 interposed therebetween which may be of metal foil and which serves as the positive electrode of the microphone. A portion of the electrode 136 is brought out into electrical contact with a metallic contact strip 137. The contact strip 137 is yieldably engaged by a terminal 138 carried by the portion 128 of the casting. The terminal has a yieldable contact 139 which extends thru a slot 140 in the shell to contact the strip under pressure.

The sides of the crystals opposite the electrode 136 similarly carry metal foil electrodes 141 which form the negative electrode of the microphone. Two plates 142 of suitable metal are disposed between the electrodes 136 and the shell 133 and are electrically joined by a contact strip 143 of the same material, the contact strip 143 being yieldably engaged by a terminal 138 in the same manner as the terminal strip 137.

The other sides of the crystal assembly are lined with pads 144 of a cork and synthetic rubber composition suitable for the purpose, the thickness of the pads being such as freely to admit the crystal assembly into the shell 133 without producing variations in the transverse static loading of the crystals, as would result should any wedging action occur. The crystal assembly is maintained in a position equi-distant between the windows 132 by means of a button 145 of the same material as the pads 144, the button being inserted through an aperture 146 in the shell 133 into cemented contact with the pad adjacent thereto.

The space between the windows 132 and crystals and between the shell 133 and the portion 128 of the casting provides a chamber into which oil is inserted under pressure. The pressure of the oil is made slightly greater than that of the air in the streamer thereby to prevent air from leaking into the chamber, it being understood that the presence of air in the chamber would also introduce variations in the received sensitivity of the crystals by creating dead spots or areas between the windows and crystals. The oil may be of any type having an acoustic impedance approximately equal to that of sea water such, for example, as castor oil, whereby sound waves which impinge upon the windows 132 produce the same effect as though the waves contacted the ends of the crystals directly.

The oil is admitted into the chamber through a check valve 147 which enters the chamber at a domed shaped surface 148 thereof. In practice, in order to insure that all air has been excluded from the chamber, the chamber is first evacuated to approximately 200 microns and then is filled with oil under pressure, the hose being positioned so that the valve 147 is uppermost thereby to force any air bubbles through the valve. The oil pressure within the chamber causes the windows to bulge and thus provides a means for visually checking the extent of pressure within the chamber.

A microphone unit, of the construction as disclosed above, and fabricated in the manner disclosed, is substantially free of azimuthal variations in the received sensitivity thereof and provides a smooth response pattern 149 of the form diagrammatically illustrated in Figs. 1, 2 and 32. It will be seen that the pattern is substantially in the form of a vertical dumbbell having a maximum sensitivity along a vertical line extending through the axis of the windows 132. In this respect the response of the microphone may be considered to be directional, however, the dumbbell form of the pattern is sufficiently non-directional as to provide an overlapping of response patterns of adjacent microphones as diagrammatically illustrated in Figs. 1 and 2. Accordingly, the maximum sensitivity occurs within a vertical plane passing through the axis of the acoustic streamer at any point throughout the length thereof. As will hereinafter more clearly appear, this plane of maximum sensitivity is utilized as a datum point from which to time the firing of the explosive charges within the explosive streamers. For this purpose it is important to maintain the plane perpendicular to the surface of the water as illustrated in Fig. 32.

In order to safeguard the acoustic streamer against a twisting action while being towed through the water which would defeat the above purpose, each hose 150 of each of the standard sections 17 of each acoustic streamer is provided with an outer wall 151, Figs. 13, 18, and 19, on the underside thereof which houses a mixture of high gravity stock 152 such as a mixture of lead oxide and rubber.

It will be understood that the resonant frequency of the microphone units depends upon the length of the crystal, the size and shape of the microphone unit generally, and other physical characteristics thereof. The hydrophone unit described above, because of its particular construction, renders the same responsive to supersonic signals over a frequency band from 47 to 55 kilocycles per second.

The terminals 138 are connected as by soldering to a pair of conductors 153, Figs. 13, 14, 16, and 17. The conductors are protected by a pair of flexible tubes 154 which, together with the conductor tape 104, extend through and are supported by, a pair of rubber plugs 155 and 156 carried by the microphone casting and coupling 127 respectively, and a suitable cushion filler 157, such as sponge rubber, which is disposed within the hose 123 between the plugs. It will be understood that the plug 155 is also conveniently formed to receive the terminals 138 and valve 147 and is provided with portions 158 which project along the sides of the vertical portion 128 of the microphone casting, Fig. 17. The portions 158 have grooves 159 through one of which the conductor tape 104 is passed, as clearly appears in Fig. 17.

The conductor tape 104 extends through the axial bore 160 of a suitable plug 161 which is inserted into the trailing end of the intermediate coupling 127 and secured therein by means of pins 162. The portion of the tape extending beyond the plug is split and the separated conductors 163 thereof are extended one each through a pair of off-set bores 164 in the plug to a point adjacent to the conductors 153. A second conductor tape 165 disposed within the hose 150 is passed through the bore 160, and the conductors 166 thereof are similarly carried back through the bores 164 and forwardly again through the axial bore 160 to a point adjacent to the conductors 153 and 163. The conductors are bared and spliced, the connection being first bound with rubber tape, not shown, and then conveniently bound with friction tape 167 to provide an air tight splice. By means of the above arrangement it will be readily understood that any strain in the conductor tapes 104 and 165 is taken up by the plug 161 rather than by the splice between the conductors thereof. As a further precaution to prevent strains in the conductors generally throughout the streamers which result from a flexing thereof, the conductors and cables are provided with sufficient slack as appears, for example, in Figs. 3 and 13.

It will be seen that the host 150, which may be of the same material as that of the host 123, is similarly secured to the coupling 127. The coupling has a centrally disposed groove 168 into which a ring 169 is inserted, and the gap between the hoses 123 and 150 is closed by a clamping device 170 to provide a smooth outer surface and thereby prevent the development of supersonic noises as the streamer is towed through the water.

It will be understood that the construction of each standard section 17 of the acoustic streamer, except for the weighted underside thereof and the difference in length, is identical to that of the short section 16 of the streamer. The standard sections are all identical except that the trailing section contains a cup shaped tail plug, Fig. 18, 171, rather than an intermediate coupling 127, and the conductors 166 of the conductor tape 165 are connected directly to the conductors 153 of the hydrophone by a splice 172 similar to that of 167. The check valve 82 in the end plug 171 is covered by a tapered tail cap 173 which is secured to the tail plug 171 by means of a bolt 174, the tail cap being streamlined thereby to prevent turbulence of the water and the development of supersonic noises as the streamer is towed through the water. The acoustic streamer disclosed in the foregoing is described and claimed in the copending application of R. H. Park et al. for Anti-Torpedo Device, Serial No. 526,624, filed March 15, 1944.

Referring now to Figs. 3, 20 and 21 in which the construction of an explosive streamer is disclosed it will be seen that the buffer section 13 thereof is similar to that of the acoustic streamer except that the hose 175 of the buffer section 13 has inserted in the trailing end thereof a coupling 176 generally of tubular configuration which also serves as the bulkhead of the buffer section and as an air tight chamber in which the detonators of the streamer are housed.

Located within the front and end tubular portions of the coupling 176 is a pair of booster cans 177 and 178 respectively through which extend an air tube 179 in air tight relation therewith. Extending between the booster cans and secured in air tight relation therewith is a through tube 180, and extending through the can 177 in air tight relation therewith is a third tube 181. The cans 177 and 178 are filled with TNT designated by the numeral 182, the explosive train between the cans being provided by a pair of fuses 183 which may be of the same material as the coil 112 and which extend between the charges through the tube 180. The tube 179 extends through an end plate 184 which is secured as by welding to the forward end of the coupling 176 thereby to serve as the bulkhead, the tube 179 being secured to the plate as by soldering, thereby to provide an air tight connection therebetween. The tube carries an air fitting 185 to which the flexible tube 74 is connected, thus completing the air line to the explosive streamer. The cable 83 extends through a stuffing box 186 carried by the plate 184 and through the tube 181, the cable being sealed in air tight relation within the stuffing box by means of the packing 187 therein which is compressed when the threaded cap 188 of the stuffing box is drawn up tight. The other end of the coupling 176 is also secured in air tight relation, the can 178 having a flange 189 which is seated tightly against a shoulder provided therefor in the coupling by means of a ring nut 190 and a gasket 191 interposed between the flange and the nut.

With the ends of the coupling 176 sealed in air tight relation as disclosed above, the chamber within the coupling between the cans 177, 178 may be opened to atmospheric pressure as by an opening 192 in the coupling without releasing the air pressure within the explosive streamer. The opening is normally closed by a cover 193 and sealed by a gasket 194 when the bolts 195 are drawn down tight. The cover has a bracket 196 depending therefrom which serves, together with the cover, to support a container 197 in which is located a tetryl pellet 198. An electroresponsive detonator 199 is extended through the bracket into the pellet and held in this position by a locking nut 200 through which the conductors 201 of the detonator extend. The conductors 201 are secured, on the free end thereof, to a plug 202 which is adapted removably to engage a jack 203 to which the conductors 204 of the cable 83 are secured, thus completing a circuit between the electrical control mechanism and the detonator.

The above described arrangement makes possible the arming of the explosive streamer just preparatory to launching the same within the water thereby to avoid prematurely exploding the streamers while still on board the vessel. Such an arrangement is described and claimed in the copending application of Harold W. Klas for Anti-Torpedo Device, Serial No. 478,509, filed March 9, 1943, and reference may be had thereto for further details of construction and operation.

Each standard section 14 of each explosive streamer comprises a length of hose 205 which may be of material similar to that of the hose 175 of the buffer section 13. The hose adjacent to the trailing end of the coupling 176 is secured thereto in the same manner as the hose 175, and the other end of the hose 205 is similarly secured to an intermediate coupling 206, Fig. 21.

A first sack ring 207 having a valley 208 to which the hose 205 is tightly clamped by means of a clamping device 88 is disposed within the hose a relatively short distance rearwardly of the coupling 176, and a second such sack ring is similarly secured within the hose adjacent to the coupling 206. Disposed within the hose between the coupling 176 and the first ring 207 is a flexible container or sack 209 of material suitable for the purpose such, for example, as canvas. The sack contains a mixture of thoroughly blended granular and flaked TNT designated by the numeral 210, and the ends of the sack are closed and preferably bound with friction tape 211 as shown.

A similarly loaded sack 212 is disposed between the rings with the open ends of the sack drawn over the same, as shown, thereby to maintain the position of the sack within the hose when the rings are clamped in place. Threaded through the sack is a fuse 214 which may be similar to the fuses 183 and which is extended through the first sack ring along the sack 209 and is inserted into the air tube 179 thereby to complete the explosive train between the booster can 178 and the sacks 209 and 212. The ends of the sack 212 are tied to the fuse by means of a cord or twine 215, tape 216 first being bound about the fuse internally of the sack adjacent to the point of application of the twine. The trailing end of the fuse 214 extends into the tube 217 of a container 218 which may be formed of cardboard or the like and which has arranged therein an explosive charge of granulated TNT designated by the numeral 219, the container being inserted into the coupling 206 and extended into the sack rings adjacent to the ends of the coupling.

It will be understood that each of the remaining standard sections 14 of each explosive streamer is similar to the section 14 just described except that a single anchored sack 220 is used in each section in place of the short sack 209 and the anchored sack 212, and that the ends of the fuse 214 are extended into adjacent containers 218 to complete the explosive train. As in the case of the acoustic streamer, the end section 14 of the explosive streamer contains a similar cup shaped tail plug 221 which carries a tapered tail cap 222 which is secured to the plug as by a bolt 223. Also, the intermediate couplings 206 are similarly provided with a central groove 224 into which a ring 225 is inserted and the gap between the adjacent hoses 205 is closed by means of a clamping device 226.

The explosive streamer disclosed hereinbefore is described and claimed in the copending application of McKinney et al. for Method and Apparatus for Anti-Torpedo Device, Serial No. 535,560, filed May 13, 1944, and reference may be had thereto for further details of construction and assembly.

Referring now to Figs. 22 through 25 in which the electrical system is diagramamtically illustrated, it will be seen that the system illustrated requires a source of 115 volts, 60 cycle A.C. power which may be supplied by any source suitable for the purpose such, for example, as an arrangement in which storage batteries are floated on the ship's D.C. line, or a convenient reduction in voltage thereof, and maintained at such voltage by suitable regulating means, the batteries being adapted to feed a rotary converter, for example, which in turn supplies the required A.C. voltage.

*Power circuit*

The A.C. voltage is applied to the primary 227, Fig. 22, of a power transformer generally designated by the numeral 228 through a switch 229 and a pair of line fuses 230. The transformer 228 includes a high voltage secondary winding 231, the voltage of which is rectified by a full wave rectifier tube 232 to provide a D.C. voltage in a conventional manner between the cathode 233, which is also the filament of the tube, and the center tap 234 of the winding 231, the plates 235 of the tube being connected to the ends of the winding 231 and the filament being connected to a low voltage secondary winding 237 of the transformer. A second low voltage secondary winding 238 of the transformer is used to provide current for the heaters of the vacuum tubes of the system, the electrical connections, to which, not being specifically shown, may be made in any conventional manner. The output of the rectifier tube 232 is first fed through a choke input filter comprising a choke 239 and a condenser 240 and then through a condenser 241 to provide across the lines 242 and 243 a smooth D.C. voltage of approximately 300 volts for the plate circuits of the electronic tubes of the system, the negative side 243 of the voltage conveniently being grounded as shown. A choke 244 is disposed in the negative line between the points 234 and 243 to provide a voltage drop which may be used as a negative bias in the squelch circuit of the system, as will appear in greater detail hereinafter, a choke being chosen for this purpose to avoid an appreciable drop in the D.C. line voltage and also to produce a smoother bias voltage. The resistors 245 and 246 serve as a voltage divider network to provide at 247 substantially the amount of bias required for the operation of the aforesaid squelch circuit, the condenser 248 being employed to eliminate any remaining ripple in the voltage.

A conventional voltage regulator gas tube 249, and series resistor 250 associated therewith, are connected between the D.C. line 242—243 and provide between 251 and 243 a regulated voltage which is applied to the squelch tube and to the screen grids of certain tubes of the system as will more clearly appear as the description proceeds.

*Band pass amplifier*

The electrical signals generated by the microphone units 18 pass through the primary 252 of the step-down transformer 103. This transformer may be of any type suitable for the purpose such, for example, as a transformer having a flat response over the desired frequency band of 47 and 55 kilocycles and which matches the high impedance of the microphone circuits to the low impedance of the short transmission line 43. The signals appear in the secondary 253 of the transformer 103 an are applied through the line 43 to the primary 254 of a similar step-up transformer 255 which forms a part of the control mechanism 30 and which matches the low impedance of the line to the high impedance grid circuit of the first tube 256 of the band pass amplifier. The transmission line 43 conveniently may be enclosed within a grounded metallic sheath or shielding.

The tube 256 may be a conventional R.F. pentode amplifier having the usual plate 257, suppressor grid 258, screen grid 259, control grid 260, cathode 261 which is connected to the suppressor grid in the usual manner, and heater 262 which is grounded, as shown. The screen grid is connected to the source of regulated voltage at 251 through a blocking resistor 263 which forces the A.C. component of the screen grid current through a by-pass condenser 264 in accordance with a conventional circuit arrangement. The voltage appearing in the secondary winding 265 of transformer 255 is applied to the control grid of the tube, one end of the winding being connected to the grid and the other end being coupled to ground by means of a coupling condenser 266. This voltage is amplified in the plate circuit of the tube. The plate circuit is connected across the D.C. line 242—243 and includes a blocking resistor 267, the closed primary circuit 268 of a tuned transformer 269, plate 257 and cathode 261 of the tube 256, and cathode bias resistor 270, the by-pass condensers 271, 272 being provided to form a low impedance path for the A.C. component of the plate current to prevent coupling between the several stages of the electrical system.

The amplified voltage appearing in the closed secondary circuit 273 of tuned transformer 269 is applied in part to the control grid 260 of the tube 274, which may be identical to tube 256, through a gain control 275 which comprises a suitable resistance 276 and adjustable wiper 277 therefor, the wiper being connected to the control grid, and one end of the resistor 276 being coupled to ground through a coupling condenser 278. The gain control conveniently may be brought out to the panel 7, Fig. 1, for the control mechanism thereby to render the gain of the amplifier adjustable from time to time as variations occur in the underwater background noise level.

The circuit connections of tube 274 are identical to those of tube 256. The plate circuit of tube 274 includes a tuned transformer 279 which may be identical to that of tuned transformer 269. Accordingly, the voltage appearing between the wiper 277 and ground is further amplified in the plate circuit of tube 274 in the same manner as in the first stage of amplification.

The voltage appearing in the closed secondary 273 of transformer 279 is applied through a voltage divider network comprising the resistors 280, 281 to the control grid 282 of a dual control amplifier tube 283, the control grid being connected to one end of the resistor 280 and the other end of the resistor being coupled to ground through the coupling condenser 213. The tube 283 is used herein as a high gain amplifier and includes a plate 284, a suppressor grid 285, a pair of screen grids 286 which are connected directly to the regulated voltage 251, a super control grid 287, a cathode 288, and a heater 289, the suppressor grid being connected to the cathode as shown. When the voltage on the expander grid is zero, the voltage appearing across the resistor 280 is amplified in the plate circuit of tube 283. The plate circuit is connected across the D.C. line 242—243 and includes a blocking resistor 290, the closed primary circuit 268 of a tuned transformer 291 which may be identical to the transformers 269 and 279, plate 284 and cathode 288 of the tube 283, and a cathode bias resistor 292, A.C. by-pass condensers 293 and 294 being provided for by-passing the A.C. component of the plate current and a condenser 295 being provided for by-passing the A.C. component of the screen current.

The transformers 269, 279, and 291 each comprise primary and secondary ferric core coils 296 and 297 respectively which may be adjusted relative to each other to vary the magnetic coupling therebetween, and each core may be adjusted within the coil thereof thereby to tune each coil to the desired frequency. The circuits 268, 273 of the primary and secondary coils are closed by fixed condensers 298, 299 respectively which are provided to obtain a coarse adjustment to the desired frequency.

It is desirable that the response at the closed secondary circuit of the transformer 291 be substantially flat over the desired frequency band and fall off sharply above and below the band in order that signals within this frequency range only pass through the amplifier. This may be accomplished in any convenient manner through a combination of coupling adjustments between the coils of the several transformers and individual tuning of the coils thereof. In practice, transformer 269 is closely coupled to provide peaks at the upper and lower ends of the band with a valley therebetween. The transformer 279 is not so closely coupled and tuned to provide a general response over the band and thus smooth out the overall response of the first two stages. Finally, the transformer 291 is closely coupled to provide peaks at the upper and lower ends of the band, resistors 300 and 301 being connected across the coils 296 and 297 respectively to provide a damping effect, thus producing a substantially flat response.

*Squelch circuit*

The expander grid 287 is coupled to ground by means of a coupling condenser 302 and normally has applied thereto a negative voltage which is supplied by the squelch circuit. The negative voltage on the expander grid biases the tube 283 nearly to cut off and prevents operation thereof as an amplifier as long as the negative voltage is applied to the expander grid. In this respect the expander grid may be regarded as an electronic gate for controlling the passage of signals through the tube. As will hereinafter more clearly appear, the squelch circuit operates in a manner to reduce the negative bias on the expander grid to zero in the case of signals of sufficient amplitude to operate the squelch circuit and which signals persist for more than approximately one fourth of a second. Thus, the gate serves to prevent fast transients of one quarter second duration, or less, from passing through the tube 283 to the last stage of amplification.

The voltage appearing in the closed circuit 273 of transformer 279 is applied through a coupling condenser 303 to the grid 304 of a triode amplifier 305, Fig. 23, the grid being connected to ground through a coupling resistor 306. The tube 305 includes the usual plate element 307, cathode 308, and heater 309, and as employed herein, provides a working voltage for the squelch circuit. The voltage appearing across the resistor 306 is amplified in the plate circuit of the tube 305. This circuit is connected between the D.C. line 242—243 and includes a blocking resistor 310, the primary 311 of an untuned transformer 312, plate 307 and cathode 308 of tube 305, and cathode bias resistor 313, the condensers 314 and 315 serving as a low impedance path for the A.C. component of the plate current.

The amplified voltage appearing in the secondary 316 of transformer 312 is applied to the grid 317 of the squelch tube 318 through an A.C. circuit which includes the condenser 319, resistor 320, and condensers 321 and 322. The grid 317 is normally maintained at a voltage below ground potential by being connected through resistor 320 to line 247 which, as described hereinbefore, is at a negative potential provided by the voltage drop across resistor 245, Fig. 22, which is connected at a point below ground potential in the negative line of the power circuit.

The tube 318 may be identical to tube 305 and, if desired, may be contained in the same envelope therewith. Tube 318, however, is operated at a lower plate voltage than tube 305, the plate 307 of tube 318 being connected to a voltage divider network comprising resistors 323, 324 and the network is connected between the regulated voltage line 251 and ground. The cathode 308 of tube 318 is connected through a resistor 325 to the negative bias line 247, thus completing the controlled or output circuit of the tube, the condensers 326 and 327 providing a low impedance path for the A.C. component of current therein.

Under "no signal" conditions, assuming that the power switch 229 is closed, the tube 318 passes sufficient current therethrough to develop a voltage across resistor 325 which renders the cathode slightly less negative than the grid 317. A condenser 328 charges to the cathode potential from ground potential through a resistor 329 and cathode resistor 325 to the negative line 247. The voltage developed on condenser 328 is applied through a coupling resistor 330, Fig. 22, to the super control grid 287 of the dual-control pentagrid tube 283, thus providing the initial negative voltage which effects the closure of the gate.

When a signal of increasing amplitude appears at transformer 312, each time the voltage in the secondary 316 thereof swings in a direction to apply positive bias to the squelch tube 318, more current flows in the cathode circuit thereof, and a voltage develops across resistors 325 sufficient ultimately to reduce the negative voltage on the cathode to zero. The voltage on condenser 328 attempts to follow the change in cathode voltage but a delay of approximately one fourth second is imposed by the time constant of the discharge circuit. This circuit may be traced as follows: from the positive side of condenser 328 through ground 243, resistor 245, Fig. 22, conductor 247, resistor 325, and resistor 329 to the negative side of the condenser 328. When the condenser is fully discharged, the voltage thereof and that of the gate 287 controlled thereby is reduced to ground potential thus opening the gate for further amplification of the signal appearing at the control grid 282 of tube 283.

*Automatic gain control*

During the time that the squelch circuit operates to effect an opening of the gate, a fast A.G.C. circuit operates to produce a leveling effect on signals of high intensity by applying a negative rectified bias to the first three stages of amplification in a well known manner. By means of the A.G.C. control, the electrical system is able to accommodate applied signals over a wide range of signal intensity, such as occur when the torpedoes pass the microphone units at varying distances above or below the same, without necessitating the employment of means for accommodating a correspondingly wide range of amplified signals or overworking the tubes which operate on the amplified signals. The A.G.C. circuit further imposes a delay in the decline of the bias thus supplied which causes the same to lag behind the signal, thereby effectively to retain the initial characteristic incremental shape of the applied signal regardless of the distortion produced therein by the A.G.C. action.

The A.G.C. circuit is also operated on the voltage produced by tube 305, the voltage appearing in secondary 316 of transformer 312 being rectified by a low voltage rectified tube 331 which comprises the conventional plate 332, cathode 333, and heater 334. The rectified current flows through a low impedance voltage divider network comprising resistors 335 and 336, the junction of the resistor 335 and cathode 333 being connected to ground, as shown.

Connected in series across the resistor 335 is a rectifier tube 337, which may be identical to the tube 331, and a pair of comparatively high resistance resistors 338 and 339, Fig. 22, the resistors being shunted by a condenser 340. The voltage appearing across resistors 338, 339 is applied as negative bias to the grids 260 of tubes 256 and 274 through coupling resistors 341 and 342 respectively and the voltage appearing across resistor 339 is applied to grid 282 of tube 283 through a coupling resistor 343.

As a signal of increasing strength appears at transformer 312, Fig. 23, the voltage across resistors 335, 336 builds up rapidly through condenser 322, and the voltage across resistors 338, 339, also builds up rapidly through condenser 340. Accordingly, the corrective bias is quickly applied to the tubes comprising the first three stages of the amplifier. However, when the strength of the signal decreases, condenser 340 is forced to discharge through the resistors 339, 338 rather than through the low impedance resistor 335 because of the one-way current flow imposed by the rectifier tube 337. Thus, a delay is imposed on the decline of the bias voltage as determined by the time required to discharge condenser 340 through resistors 339, 338.

The lag in the corrective bias produces an abrupt drop in a torpedo signal of relatively high intensity whose normal maximum peak and abrupt decline thereafter would otherwise be rounded or flattened by the A.G.C. action, the drop occurring immediately after the maximum peak has been reached. Accordingly, the delayed bias serves to reproduce this characteristic incremental shape of an electrically simulated torpedo signal.

A tube 344 of the type known as an electric eye, Fig. 23, is employed to indicate visually variations in the underwater sound level and the condition of the equipment of the system. The elements of the tube comprise a conventional fluorescent target 345 connected to the D.C. line 242, a plate 346 connected to the line through a resistor 347, a grid 348, a cathode 349 connected directly to ground, and a heater 350. The negative voltage across resistors 335, 336 is applied to the grid of the tube 344 when a two position switch 351 is moved into the position shown in a full line on the drawing. A negative increase in the voltage on the grid of the tube 344 reduces the voltage drop across resistor 347 thereby increasing the plate voltage of the tube which causes the "eye" to close in a well known manner.

As used in practice, the "eye" is normally open and flutters as variations in the background noise level occur. However, when a torpedo passes the detection streamer, or when a simulated test signal is applied to the control means as by a test signal generator, not shown, the "eye" closes and overlaps momentarily. If the "eye" closes and remains closed, it indicates that the streamers are too close to the vessel or that some portion of the equipment is faulty. The "eye" is also employed as a means for visually comparing the condition of the firing circuits to that of a dummy circuit when the switch 351 is moved into the dashed line position, as will hereinafter more clearly appear.

*Discriminator circuit*

The voltage signal appearing across resistor 301 in the closed secondary circuit of transformer 291, Fig. 22, is applied to the grid 352 of a triode amplifier 353, Fig. 25. The tube 353, as employed herein, provides a working voltage for the discriminator circuit and comprises the usual plate 354, cathode 355, and heater 356. The voltage signal on the grid 352 is amplified in the plate circuit of the tube. This circuit is connected between the D.C. line 242—243 and includes a blocking resistor 357, the primary winding 358 of an untuned transformer 359, plate 354 and cathode 355 of tube 353, and cathode bias resistor 360, the condensers 361, 362 providing a low impedance path for the A.C. component of plate current in the usual manner.

The amplified signal appearing in the secondary winding 363 of transformer 359 is rectified by a low voltage detector tube 364. This tube may be identical to tube 331 and, if desired, may be enclosed in the same envelope therewith. The envelope of the rectified voltage is applied to three parallel circuits as follows: the A.C. by-pass condenser 365, a low impedance voltage divider network comprising series resistors 366, 367, and 368, and a modulating circuit including the condenser 369, resistors 370, 371, and A.C. by-pass condenser 372 and the vacuum tube 411, respectively.

When the signal is produced by a torpedo passing the detection streamer, the voltage of the signal envelope follows the curve generally designated by the numeral 373, Fig. 27, in which the high frequency component of the signal has been filtered out and the envelope is shown isolated from the amplified torpedo signal. This curve is an approximate representation of the electrically simulated torpedo signal generated by the microphone units after the gate 287 of tube 283 has opened, it being understood that the portion of the signal which operates the squelch circuit is arrested by the gate and therefore does not reach the discriminator circuit. It is to be noted that the curve 373 comprises a series of fluctuations 374 of increasing amplitude and of short duration, and that the curve 375 representing the average value of the fluctuations rises gradually to a peak and thereafter declines sharply.

The condenser 365 is of small capacitance and offers little filtering to the pulsating voltage of the envelope 373 of the signal. Accordingly, the voltage variations 374 of the curve 373, appear across the low impedance network comprising the resistors 366, 367, and 368. This voltage is applied to a condenser 376 through a resistor 377 and plate 332 and cathode 333 of a twin diode rectifier 378 of the type suggested for combining tubes 331 and 364 in a single envelope. However, the voltage on the condenser 376 does not follow the negative excursions in the modulating voltage because of a high resistance discharge path imposed thereon by the one-way valve action of tube 378, the discharge circuit comprising the resistor 379, and the resistor 380 and condenser 381. Condenser 381 charges to a potential of approximately one half the voltage on the voltage divider network 366, 367, and 368, the condenser being connected to the junction of resistors 367 and 368 through a resistor 382 and the second circuit 332, 333 of tube 378. Condenser 381 is of much greater capacity than the capacitance of condenser 376, and, accordingly, the voltage thereof reaches its peak value much later than condenser 376. The rectifying action of tube 378 imposes the high resistance discharge path of resistor 380 on condenser 381, thus substantially maintaining the voltage thereon.

Since the voltage of envelope 373 drops off sharply after reaching the maximum peak thereof, the voltage on condenser 376, which follows the peaks of the modulations 374 thereof, drops rapidly to the potential maintained by condenser 381 and thereafter follows the gradual decline in voltage of the condenser 381. The voltage variations on condenser 376 are represented by the curve 383, Fig. 27. It will be understood that the voltage on condenser 376 generally follows the curve 375 showing the average value of the modulations in a torpedo signal, or the curve of a test signal in which there are no modulations in the signal, and in either case, the voltage on condenser 376 is sustained by condenser 381 substantially as shown by the curve 384 representing a departing from the curve 375.

A condenser 385 charges to approximately two thirds the value of the envelope voltage applied to the network 366, 367, 368, the condenser being connected to the junction of resistors 366 and 367 through a resistor 386. Condenser 385 has a capacitance greater than condenser 376 but less than the capacitance of condenser 381 and, therefore, reaches its peak voltage somewhat later than condenser 376. The voltage variation on condenser 385 is represented by the curve 387, Fig. 27. It will be understood that the voltage at condenser 385 has undergone a filtering process to the extent that the voltage substantially follows the average value of the envelope voltage at the junction of resistors 366, 367. Accordingly, when no modulations are present in the envelope 373, the voltage on condenser 385 exceeds the voltage on condenser 376 between the points 388 and 389 of the curve 387. As will hereinafter more clearly appear, the occurrence of this dominating voltage on condenser 385, in the case of an unmodulated signal causes an operation of the firing control mechanism. It will be noted that curve 375 rises more rapidly than curve 387. This insures that the curves will not intersect until curve 375 has passed its peak, thus, premature operation of the firing control mechanism cannot occur.

The voltages on condensers 376, 385 are applied to the grids 390 of a pair of identical high gain amplifier triode tubes 391 and 392 respectively, each of the tubes comprising a conventional plate 393, cathode 394, and heater 395. The controlled or output circuit of tube 391 is connected across the D.C. line 242—243, the plate being connected directly to the line 242 and the cathode being connected to ground through the cathode bias resistor 396, a condenser 397 providing an A.C. by-pass therefor. The tube 392 is similarly connected to the line 242—243, the cathode being connected to ground through a cathode bias resistor 398. However, in the case of tube 392 the plate is connected to the line 242 through a loading resistor 399 which insures that the voltage across the resistor 398 does not exceed the voltage drop across resistor 396 in the event that the tubes 391, 392 should draw excessive current under "maximum signal" conditions such, for example, as may be produced by a sustained high level overload signal.

The voltages on condensers 376, 385 are amplified in the controlled circuits of tubes 391, 392 respectively, and the variations in the voltages appear substantially in the same form across the cathode bias resistors 396, 398 thereof, the polarities of the voltages developed being as indicated on Fig. 25 by the plus and minus signs associated therewith. Resistors 396 and 398, together with resistor 371 of the amplitude modulation responsive circuit, a coupling resistor 402, and a bias battery 403 comprise the grid circuit of a four element gas tube 404. Tube 404, as employed herein, is a trigger tube and comprises a plate 405 which is connected to line 242 through a resistor 406, a suppressor grid 407, control grid 408, and cathode 409 which is connected to the suppressor grid and to the cathode 394 of tube 391, the battery 403 being connected to the grid 408 thereby to apply a fixed negative bias voltage thereto. The tube 404 normally does not pass current because of the negative bias applied to the control grid thereof by the battery 403. However, when this bias is reduced to a predetermined value, the resistance of the tube becomes substantially zero and the tube conducts or fires.

A voltage is developed across the resistor 371 of the polarity as indicated on the drawing when each of the modulations in the envelope swings positive, a condenser 410 being employed to maintain the voltage of the modulations at the average values thereof. This voltage is prevented from building up in the opposite direction by means of a low voltage rectifier tube 411 which by-passes the resistors 371, 370 when the modulating current swings negative. The tube 411 may be identical to tube 337, Fig. 23, and, if desired, may be arranged in a single envelope therewith. It will be noted that the voltage developed across resistor 396 is in a direction to increase the negative bias on the grid 408 whereas the voltages of resistors 398 and 371 tend to oppose and reduce the negative bias.

Figure 28:
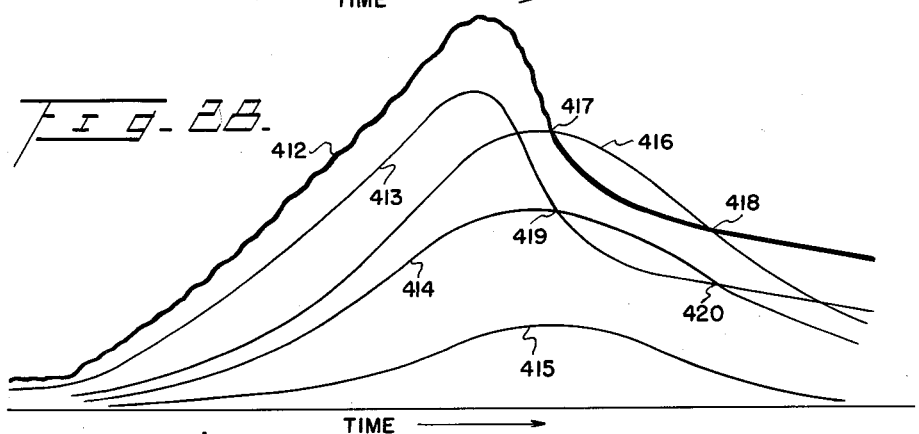
Fig. 28 shows a group of curves respectively illustrating variations in the voltage in each of the various portions of the grid circuit of the firing tube caused by a torpedo signal.

In Fig. 28 a group of curves is illustrated which represent the variations in voltage on resistors 396, 398 and 371. Curves 412 and 413 indicate the variation in voltage on resistor 396 for modulated and unmodulated electrically simulated torpedo signals respectively, and curves 414 and 415 indicate the voltages on resistors 398 and 371 respectively, the curve 416 representing the sum of the voltages appearing on resistors 398 and 371. It will be observed that the voltage of curve 416 predominates over that of curve 412 between the intersections 417, 418 thereof, and that the voltage of curve 414 predominates over that of curve 413 between the intersections 419, 420 thereof. Accordingly, in each case of the predominating voltages, if the peak of the signal has reached a predetermined value, the dominating voltage is sufficient to reduce the negative bias of the battery 403 and fire the trigger tube 404. It will also be observed that the difference between the curves 412, 413 due to modulations in the signal is compensated for by the curve 415, the amplitude of which depends upon the modulating voltage. Thus, it is apparent that by this compensating arrangement, the circuit is rendered uniformly responsive to a wide range of signals in which the modulations thereof are of varying amplitude.

The dominating voltage begins at approximately seven tenths of maximum peak value of the signal at the intersections 417, 419 and terminals at intersections 418, 420 by the levelling off of curves 412, 413 respectively which, as described hereinbefore, is controlled by the condenser 381. The interval, thus defined, closely follows the datum point established by the substantial synchronization of the maximum response sensitivity of the detecting streamer and the transit of a torpedo with respect thereto, the maximum peak of the envelope of the torpedo signal occurring as the torpedo's propellers pass the streamer. Accordingly, the interval bears a specific time relation to the datum point, and time delays corresponding to the time of travel of the torpedo between the detection streamer and a predetermined position with respect to a selected explosive streamer may be accurately determined and interposed, thereby to synchronize the firing of the explosive streamer and the movement of the torpedo into such positions.

From the foregoing it will be understood that the discriminator circuit is adapted to fire the trigger tube on either modulated or unmodulated signals under predetermined circuit conditions and upon application of signals of specific characteristics. In practice, for example, the trigger tube is fired if a 5 microvolt signal is applied to transformer 255 at approximately 51 kilocycles per second unmodulated, or modulated 60 percent at 60 cycles per second, and the signal varies from zero to maximum value and back to zero value within one second and develops a maximum envelope voltage of approximately 30 volts peak value.

It will be understood that for test purposes both modulated and unmodulated signals are applied selectively to the input transformer 255 as by the test signal generator, referred to hereinbefore, in order to test the response of the circuit to modulations in the signal, it being understood that modulations of characteristic quality are necessary to develop the voltage of curve 415 which, as has been seen, is essential in producing a predominating opposing bias in the case of a modulated signal.

From the foregoing it is clear that firing of the trigger tube cannot occur unless a signal of sufficient amplitude produces a predominance of opposing bias between the points 417—418 and 419—420, and that the condition of predominance depends upon the sharp decline in the curves 412 and 413 following the peaks thereof, and the quality of modulation in the case of a modulated signal. However, as previously described, the curves 412, 413 follow the voltage of the signal as embodied in the envelope thereof. Accordingly, in the case of a signal which does not embody the characteristic sharp decline from the maximum peak thereof, a predominating opposing bias cannot appear.

Figure 29:
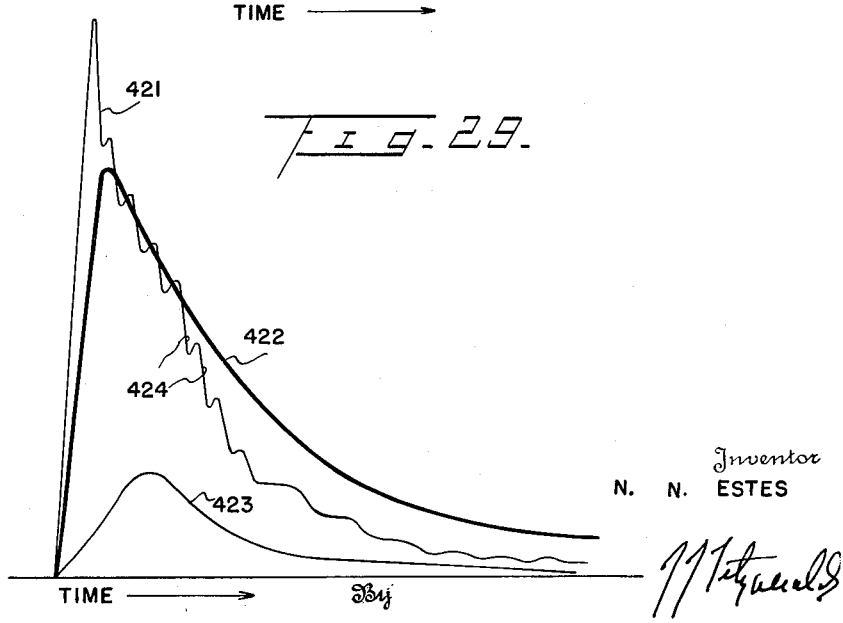
Fig. 29 shows a group of curves illustrating variations in voltage at the same portions of the discriminating circuit referred to in Fig. 27 caused by a countermine signal.

Such a signal, as a countermine signal, for example, is illustrated in Fig. 29, the curve 421 indicating the envelope of the declining portion of the countermine signal, it being understood that the peak of the signal occurs within the first quarter second thereof and, accordingly, does not pass the gate of the amplifier circuit. It will be seen that the curve 422, which represents the voltage on condenser 376 and also the voltage on the cathode bias resistor 396, closely follows the envelope voltage whereas curve 423, which indicates the voltage on condenser 385 and also the voltage on cathode bias resistor 398, is comparatively insignificant, a curve representing the voltage on resistor 371 not being shown on Fig. 29 inasmuch as the modulations 424 in the countermine envelope are of insufficient amplitude to develop an appreciable voltage. It is apparent, therefore, that in the case of a countermine signal, in which only the gradual declining portion thereof enters the discriminator circuit, a dominating opposing bias cannot be developed to fire the trigger tube for the reason that the curves 422 and 423 do not intersect.

From the foregoing it should now be apparent that a discriminator circuit has been provided which is responsive to several distinct properties of electrically stimulated underwater sound signals such as amplitude, incremental shape, and modulation, the circuit being effective, upon response thereof to a signal having properties each of a quality indicative of an approaching torpedo, to analyze the amplitude, incremental shape, and modulation of the signals and to cause an operation of the trigger tube within a specific and limited interval of time corresponding to a specific incremental or fractional portion of the signal.

A test plug 425, Fig. 25, having a plurality of pins or prongs 426 through 431, is provided at any suitable position on the firing control mechanism such as the panel 7 thereof, and test leads are brought out to the pins whereby critical portions of the electrical system conveniently may be checked from time to time. Pins 426, 427, for example, are connected across the series opposing resistors 396, 398 respectively, and a measure of the voltage therebetween gives an indication of the polarity and amplitude of the bias in the grid circuit of tube 404. Likewise, voltage measurements between pins 428 and 429, 430 and 429, and 431 and 429 give indications of the voltage on the cathode of the squelch tube 318, the voltage across the A.G.C. circuit divider network 335, 336 as visually indicated by the electric eye tube 344, and the envelope voltage appearing across the discriminator circuit divider network 366, 367 and 368 respectively.

*Firing circuit*

The trigger tube 404 controls the discharge of a condenser 432 and the actuation thereby of a sensitive firing relay generally designated by the letter R, Fig. 24, the discharge circuit including a resistor 433, tube 404, and relay R. Tube 404, under "no signal" conditions, offers a high impedance to the flow of current therethrough, and, accordingly, condenser 432 charges through resistors 406, 433, relay R, and resistor 396 to a potential substantially equal to that of the D.C. line 242—243, the charging current of condenser 432 being too small to actuate the relay. When the trigger tube is fired, however, as by a torpedo signal, the internal resistance thereof is reduced substantially to zero and condenser 432 discharges substantially instantly through relay R. The discharge current is of sufficient strength and duration to actuate the relay, whereupon the pairs of contacts 435, 436 and 437, 438 controlled thereby are closed. Contacts 435, 436 short circuit the winding of relay R, and the current generated by the collapse of the magnetic field of the relay serves to prolong the operated condition thereof.

Upon discharge of condenser 432, the voltage between the plate and cathode of the trigger tube is reduced below the sustaining voltage thereof, and the tube is extinguished. Moreover, the tube cannot again fire until condenser 432 becomes fully charged, thus providing a dead interval of time between successive actuations of tube 404 which dead interval is determined by the time constant of the charging circuit of condenser 432. The interval thus provided serves to afford the protection against operation of the discriminator circuit by a countermine signal which appears when an explosive streamer is fired.

Relay R controls the operation of a starting magnet generally designated by the letter M, Fig. 24, when a three-position detonator or transfer switch generally indicated by the designation DS is in the "Arm" position thereof, the magnet being energized by the A.C. source through power switch 229, Fig. 22. A second three-position transfer switch generally represented by the designation TS upon movement into the "Transfer" position thereof is adapted to actuate magnet M when switch DS is in either its "Safe" or "Test" position, and switch TS upon movement into the "Destroy" position thereof is adapted to actuate magnet M independently of switch DS.

Switch DS comprises a plurality of movable contact springs 439 through 445 which are adapted to be moved with respect to fixed contacts associated therewith by a plurality of coating cams 446 through 452 respectively. Each contact spring carries a button 453 of suitable insulating material which is directly engaged by the cam associated therewith, each spring being yieldably urged in the direction of its coacting cam thereby to follow the movement of the cam. The cams are mounted upon a common shaft 454 having a handle 455 and are adapted to perform a rotative movement together therewith upon movement of the handle between the three positions of switch DS, as indicated on the drawing. The several cams are of varying contours, and accordingly, the springs actuated thereby take the different positions indicated in the tabulation of Fig. 30 when switch DS is moved into any of the three positions thereof.

Switch TS similarly comprises movable contact springs 456, 457 which are adapted to be moved into engagement with fixed contacts associated therewith by a coacting cam 458 common to both springs. Each spring is biased in the direction of the cam and carries a button 459 of suitable insulating material which is adapted to engage the cam and to follow the cam as the cam moves rotatively. The cam is mounted upon a shaft 460 having a handle 461 and is adapted to rotate together therewith upon movement of the handle between a neutral or mid-position of switch TS and each of the "Transfer" and "Destroy" positions thereof as indicated on the drawing. The handle is normally prevented from moving into the "Destroy" position by any suitable stop means such as a pin 462 which conveniently may be removed to permit movement of the handle into the "Destroy" position under certain conditions of operation.

The magnet M forms a part of and controls the operation of a timing distributor device generally designated by the letter D. Distributor D comprises a synchronous motor of any well known type suitable for the purpose such, for example, as a Telechron motor having the usual actuating winding 463 which in this case is continually energized by the A.C. source which supplies power transformer 228, Fig. 22, being connected to the primary 227 thereof by conductors 464, 465. The motor also includes the usual gear reduction, not shown, connected to the output shaft, a stop wheel 466 being secured to the output shaft for rotation therewith, the direction of rotation being as indicated on Fig. 24 by arrow 467.

The stop wheel 466 carries four stops 468 spaced on the periphery thereof and is releasably held against rotation by means of a latch 469 which normally engages the wheel and the stops in successive order under the biasing action of a spring 470. The latch carries the armature 471 of the magnet M, and, accordingly moves together therewith when the magnet is energized, thus releasing the wheel for rotation until the magnet is deenergized and the latch again moves into engagement with the next succeeding stop 468 under the restoring action of spring 470.

The latch includes an arm 472 which is adapted to actuate a movable contact spring 473 of a switch generally indicated by the designation S5, the switch preferably being of a type well known in the art as a microswitch and including a button 474 of suitable insulating material which is carried by the spring and contacted by the arm 472. When the starting magnet M is actuated by relay R, the latch is withdrawn from engagement with one of the stops 468 for a period of time only sufficient to set the stop wheel in motion. However, the stops 468 mechanically maintain the latch and switch S5 controlled thereby, in an actuated position for a predetermined interval of time controlled by the width of a stop and the speed of rotation of the stop wheel.

A shaft 475 is secured to the stop wheel for rotation therewith and carries four identical axially spaced cams 476 through 479 which are adapted to actuate the movable contact springs 480 through 483 of switches generally indicated by the designations S1 through S4 respectively. Each of the switches S1 through S4 may be identical to switch S5, each contact spring thereof having a button 474 composed of insulating material which is engaged and controlled by the cam associated therewith.

Figures 30, 31:
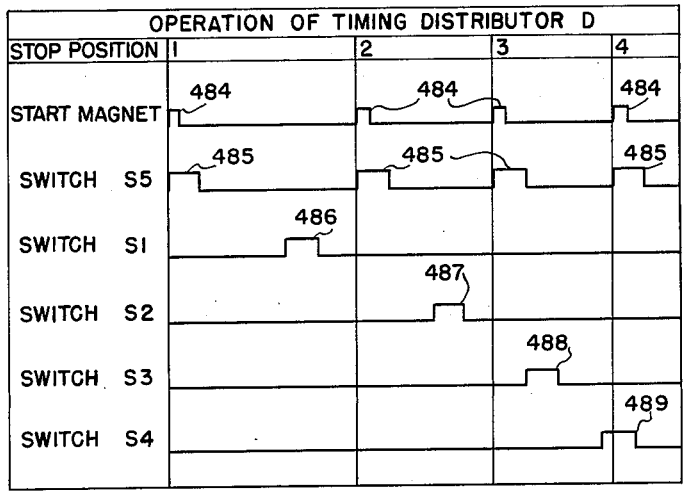
Fig. 30 is a tabulation of the different positions assumed by the contact springs of the detonator switch DS when the switch is moved into each of the three positions thereof.
Fig. 31 is a chronogrammatic diagram illustrating the operation of the timing distributor; and, Fig. 32 diagrammatically illustrates a preferred spaced relationship between an acoustic streamer and two explosive streamers arranged in the path of travel of a torpedo in accordance with the invention and also illustrates the vertical dumbbell response pattern of the acoustic streamer.

Cams 476 through 479 also are axially and circumferentially spaced about the shaft 475, and, accordingly, the switches respectively actuated thereby are operated in succession during a single rotation of the shaft as indicated by the chronogrammatic diagram of Fig. 31, a different switch being actuated during each movement of the stop wheel between successive stop positions.

Referring now to Fig. 31, the raised line portions 484 and 485 indicate comparatively the length of time that the starting magnet M is energized by each actuation of the relay R, and the length of time that switch S5 is mechanically maintained closed by each of the stop members 468 respectively, the spacing between the raised line portions indicating comparatively the time of movement of the stop wheel between each of the several successive positions thereof. Raised line portions 486 through 489 similarly indicate the time delays between the actuation of magnet M and the actuation of switches S1 through S4 respectively, the length of the raised portions 486 through 489, being substantially equal and indicating the length of time that each of the switches is actuated. Thus, the time delay between each actuation of relay R and the selective actuation of switches S1 through S4 is determined by the speed of rotation of the stop wheel and the angular spacing of the lobes of the cams 476 through 479 with respect to stop positions 1 through 4 respectively. In practice, the cams are each angularly adjustable on the shaft 475 thereby to vary the angular settings of the lobes thereof in accordance with each predetermined time delay, such, for example, as the time delays shown on Fig. 31. Moreover, if desired, the sequence of actuation of switches S1 through S4 may be varied by an adjustment of the cams 476 through 479 on the shaft 475.

The four stop positions of the stop wheel are visually indicated by numerals 1 through 4 inscribed upon a translucent disk 490 which is carried on the free end of shaft 475 of distributor D. The distributor may be disposed in such a manner as conveniently to display the numerals on the disk selectively in succession through a window 434 in the panel 7 of the control mechanism, Fig. 24, thereby to indicate the instant position of the stop wheel and the next successive one of the switches S1 through S4 to be operated upon further actuation of the magnet M, a lamp 491 being preferably mounted behind the disk to illuminate the numerals. The lamp 491 is conveniently energized by the low voltage winding 238 of power transformer 228, being connected thereto by conductors 492 and 493.

Distributor D and switch DS jointly control the energization and operation of the detonators of the streamers and a dummy detonator, the letter designators AD, ID, OD, and DD generally indicating the detonators arranged within the acoustic streamer, inboard explosive streamer, outboard explosive streamer respectively, and the dummy detonator. The detonators are energized by an isolation transformer 494, Fig. 24, which does not physically form a part of the control mechanism, being disposed at a distance therefrom and having a primary winding 495 which may be supplied directly from the 115 volt, 60 cycle A.C. source thereby to avoid leakage currents from the electronic circuit of sufficient strength to fire the detonators prematurely. The secondary winding 496 of the transformer supplies current to the detonators through a projection lamp 497 in series therewith which, when the current therethrough becomes excessive, as in the case of a short circuited detonator, increases in resistance sufficiently to protect the transformer from damage.

The dummy detonator DD comprises a resistor whose resistance value substantially corresponds to that of the streamer firing circuits, and the voltage developed therein is used as a standard voltage to which the voltages developed in the streamer detonators are compared for the purpose of testing the continuity of the detonator circuits. For this purpose, a voltage reducing resistor 498 is inserted into each of the detonator circuits in succession when switch DS is moved into the "Test" position thereof, during the movement of the distributor into each of the successive positions thereof, thus providing a small current flow in each of the detonator circuits insufficient to fire the detonators.

The voltages developed in the various detonator circuits by the small current flowing therein are applied selectively through a matching transformer 499 to the control grid 348 of the electric eye 344, Fig. 23, when switch 351 is moved into the dashed line position thereof, one side of secondary winding 500 of the matching transformer being connected to ground and the other side to switch 351. Thus, any variation from the standard voltage developed in each of the detonator circuits, such, for example, as may be caused by a short circuit or open circuit therein is visually indicated by the electric eye.

When switch 351 is closed, the electric eye gives an indication determined by the voltage drop across a resistor 501 which is preferably of greater resistance than the detonator circuits. Resistor 501 is connected to the primary 502 of the matching transformer, and is continually energized by transformer 494, being connected to secondary 496 thereof, through conductors 503, 504, resistor 498, conductor 505, and lamp 497. When the proper one of the switches S2 through S5 is actuated, a selected detonator circuit is connected in parallel with resistor 501, and the combined effect causes the electric eye momentarily to give a different indication.

With power switch 229 closed and switch DS in the "Arm" position, and the distributor D in position 1, a circuit is completed for energizing magnet M when relay R is actuated. This circuit may be traced as follows: from the lower side of primary winding 227 of the power transformer through conductors 465, 506, contacts 437, 438 of relay R, conductor 507, contacts 508, 440 of switch DS, conductors 509, 510, magnet M, and conductors 511, 464 to the opposite end of winding 227. Energization of magnet M operates the latch 469 and permits rotation of the stop wheel to stop position 2 thereof. In like manner, successive acuations of magnet M produces successive movements between adjacent stop positions of the wheel, each movement being indicated by the appearance of numerals 1 through 4 in succession in the window of the panel.

When the stop wheel moves from position 2 to position 3, a circuit momentarily is completed for firing detonator AD. This circuit may be traced as follows: from the lower side of secondary winding 496 of the isolation transformer, through conductor 512, conductor 517, detonator AD, conductor 513, contacts 443, 514 of switch DS, conductor 515, contacts 481, 516 of switch S2, conductor 518, contacts 442, 519 of switch DS, conductors 520, 505, and lamp 497 to the other side of the secondary winding 496.

Similarly, when the stop wheel moves from position 3 to position 4, a circuit for firing detonator ID is completed momentarily which circuit may be traced as follows: from the lower side of secondary 496 of transformer 494 through conductors 512, 521, detonator ID, conductor 522, contacts 444, 523 of switch DS, conductor 524, contacts 482, 525 of switch S3, conductor 518, contacts 442, 519 of switch DS, conductors 520, 505, and lamp 497 and thence to the other side of the secondary winding 496.

With the stop wheel in position 4, switch S4 is in an actuated position as clearly indicated in Fig. 31. Accordingly, when magnet M is actuated a circuit is completed through switches S4 and S5 for firing detonator OD without an additional delay which circuit may be traced as follows: from the lower side of the secondary winding 496 through conductors 512, 526, detonator OD, conductor 527, contacts 445, 528 of switch DS, conductor 529, contacts 483, 530 of switch S4, conductor 531, contacts 473, 532 of switch S5, conductor 518, contacts 442, 519 of switch DS, conductors 520, 505, and lamp 497 to the other side of the secondary winding 496.

Thus, it is seen, that through the above described arrangement of the circuits and adjustment of the switches of distributor D, the detonator OD of the outboard explosive streamer 11 is fired substantially at the instant of actuation of relay R whereas a time delay is interposed between the operation of relay R and the firing of the detonator ID of the inboard explosive streamer 10. The manner in which this arrangement is utilized to fire the detonators selectively in advance of the transit of a torpedo with respect to the explosive streamers thereof will appear more clearly hereinafter in the description of the operation of the system.

If it is desired to fire each of the detonators AD, ID, and OD manually and independently of the relay R for the purpose of destroying the streamers in the event that the same have been damaged or for any reason are likely to foul the propellers of the vessel, or to prevent the apparatus from falling into the possession of the enemy, as the case may be, this may be accomplished by moving the switch TS into the "Destroy" position thereof after removal of the pin 462 therefrom.

With switch TS in the "Destroy" position, a circuit for energizing magnet M is completed which may be traced as follows: from the lower side of primary winding 227 of the power transformer 228 through conductors 465, 534, 535, contacts 456, 536 of switch TS, conductors 537, 509, 510, magnet M, and conductors 511, 464 to the other side of the primary winding 227. The energization of magnet M is maintained as long as switch TS is held in the "Destroy" position, and, accordingly, retraction of the latch 469 permits continuous rotation of the stop wheel through at least one revolution thereof, thus firing the detonators through the firing circuits, as traced, in succession during a single revolution of the stop wheel. In order to prevent accidental firing of the detonators through inadvertent movement of switch TS into the "Destroy" position, the pin 462 is provided, the pin being removed only in cases of emergency.

Except during the moment of energization of the detonators by the respective switches S2, S3, S5, each detonator AD, ID, OD is short circuited by the associated switch. The circuit for short circuiting detonator AD with the stop wheel in position 2 may be traced as follows: from conductor 512, through conductor 517, detonator AD, conductor 513, contacts 443, 514 of switch DS, conductor 515, contacts 481, 538 of switch S2, conductor 539 and thence to conductor 512. The circuit for short circuiting detonator ID when the stop wheel is in position 3 may be traced as follows: from conductor 512 through conductor 521, detonator ID, conductor 522, contacts 444, 523 of switch DS, conductor 524, contacts 482, 540 of switch S3, conductor 539 and thence to conductor 512. The circuit for short circuiting detonator OD, when the stop wheel is in position 4 thereof and magnet M is unoperated, may be traced as follows: from conductor 512 through conductor 526, detonator OD, conductor 527, contacts 445, 528 of switch DS, conductor 529, contacts 483, 530 of switch S4, conductor 531, contacts 473, 541 of switch S5 and thence to conductor 512. The circuit for short circuiting detonator OD when the stop wheel is in any position other than position 4 thereof may be traced as follows: from conductor 512 through conductor 526, detonator OD, conductor 527, contacts 445, 528 of switch DS, conductor 529, contacts 483, 543 of switch S4 and thence to conductor 512.

With switch DS in the "Safe" position thereof, additional circuits are provided for short circuiting the detonators, the circuit for short circuit detonator AD being traced as follows: from conductor 512 through conductor 517, detonator AD, conductor 513, contacts 443, 544 of switch DS, conductor 545 and thence to conductor 512. The circuit for short circuiting detonator ID may be traced as follows: from conductor 512 through conductor 521, detonator ID, conductor 522, contacts 444, 546 of switch DS, conductor 545 and thence to conductor 512. The circuit for short circuiting detonator OD may be traced as follows: from conductor 512 through conductor 526, detonator OD, conductor 527, contacts 445, 547 of switch DS, conductor 545 and thence to conductor 512.

With switch DS in the "Safe" position, magnet M may be energized through a circuit which is established when switch TS is moved into the "Transfer" position thereof. This circuit may be traced as follows: from the lower side of primary winding 227 of the power transformer through conductors 465, 534, contacts 548, 457 of switch TS, conductor 549, contacts 439, 550 of switch DS, conductor 510, magnet M, and conductors 511, 464 to the upper side of the primary winding 227. In practice, switch TS is employed for the purpose of setting the stop wheel in a selected position thereof prior to moving the switch DS, into its "Arm" position. It will be noted that switch TS is ineffective, when in the "Transfer" position thereof, to cause the energization of magnet M when switch DS is in its "Arm" position since contacts 439, 550 of switch DS in such case are open. Thus, with switch DS in the "Arm" position thereof, inadvertent changes in the setting of the distributor by moving the switch TS into the "Transfer" position are prevented.

Switch TS is also employed in making the comparative tests on the detonator circuits. With switch DS in its "Test" position, contacts 439, 550 thereof are closed and magnet M is energized when switch TS is moved into the "Transfer" position thereof in the same manner as when switch DS is in the "Safe" position. Accordingly, switch TS may be moved into the "Transfer" position for a period of time necessary to control the distributor D through a desired degree of movement thereof thereby to actuate one or more of the switches S1 to S4 during such movement.

With switch 351, Fig. 23, set to the dashed line position thereof, the electric eye indicator 344 assumes a fixed position, as described hereinbefore. If switch TS is held in the "Transfer" position, detonators DD, AD, ID, and OD are energized momentarily in sequence during each revolution of the stop wheel, and the voltages developed across detonators AD, ID, and DD affect the electric eye in the same manner as the voltage developed across the dummy detonator DD when the detonator circuits are in an operable condition.

During the movement of the stop wheel from position 1 to position 2 with the switch TS held in the "Transfer" position thereof, the dummy detonator DD is energized momentarily through a circuit which may be traced as follows: from the lower side of the secondary winding 496 of the isolation transformer 494 through conductors 512, 551, dummy detonator DD, conductor 552, contacts 480, 553 of switch S1, conductor 518, contacts 441, 554 of switch DS, conductor 555, resistor 498, conductor 505, lamp 497, and thence to the opposite side of the secondary winding 496. It will be noted that, except at the moment of actuation of switch S1, a circuit is provided therethrough for short circuiting the dummy detonator DD to conductor 512. This circuit may be traced as follows: from conductor 512 through conductor 551, dummy detonator DD, conductor 552, contacts 480, 556 of switch S1, and conductor 539 to conductor 512.

During the movement of the stop wheel from position 2 to position 3 thereof, detonator AD is energized momentarily through a circuit which may be traced as follows: from the lower side of the secondary winding 296 of the isolation transformer through conductor 512, conductor 517, detonator AD, conductor 513, contacts 443, 514 of switch DS, conductor 515, contacts 481, 516 of switch S2, conductor 518, contacts 441, 554 of switch DS, conductor 555, resistor 498, conductor 505, lamp 497 and thence to the other side of the secondary winding 496.

During the movement of the stop wheel from position 3 to position 4 thereof, detonator ID is energized momentarily through a circuit which may be traced as follows: from the lower side of the secondary winding 496 of the isolation transformer through conductor 512, 521, detonator ID, conductor 522, contacts 444, 523 of switch DS, conductor 524, contacts 482, 525 of switch S3, conductor 518, contacts 441, 554 of switch DS, conductor 555, resistor 498, conductor 505, lamp 497 and thence to the upper side of the secondary winding 496.

When the stop wheel moves in position 4 thereof, detonator OD is energized through a circuit which may be traced as follows: from the lower side of the secondary winding 496 of the isolation transformer through conductors 512, 526, detonator OD, conductor 527, contacts 445, 528 of switch DS, conductor 529, contacts 483, 530 of switch S4, conductor 531, contacts 473, 532 of switch S5, conductor 518, contacts 441, 554 of switch DS, conductor 555, resistor 498, conductor 505, lamp 497 and thence to the other side of the secondary winding 496, this circuit being interrupted during the movement of the distributor from position 4 to position 1.

In the operation of the system of the present invention, in practice, the streamers 10, 11 and 12 and hydrophone 34 are arranged within the water with respect to the vessel and towed thereby as shown in Figs. 1 and 2. The power switches 229, Fig. 22, of the control mechanisms 30, 32 are closed thereby to energize the electronic circuits and distributors D thereof. Each detonator switch DS is set in the "Safe" position, and switch 351 for the electric eye is set in its full line position thereby to give a visual indication of the underwater sound level.

At the end of predetermined intervals of time each detonator switch DS is moved into the "Test" position thereof and the several detonator circuits are tested for continuity. Also, the electronic circuit of each control mechanism is tested by applying thereto, as by the test signal generator referred to hereinbefore, electrically simulated, modulated and unmodulated torpedo signals and countermine signals, and the proper response of the circuits to such signals is visually indicated by the change in the settings of the stop wheel as made manifest by the change of numerals in the window of the panel. In the event that the proper response is not obtained, the gain control 275 is adjusted and the signals reapplied to the electronic circuit until the correct operation occurs. When the tests have been completed, the stop wheel of each control mechanism is moved into position 3 thereof by manual manipulation of its associated transfer switch TS with respect to the "Transfer" position thereof. With the stop wheels in position 3 the system is in readiness to fire the inboard explosive streamers 10 upon subsequent arming of the system and the detection thereby of the first signal indicative of a torpedo.

During the interval between test periods, the detonator switch DS of each control mechanism is maintained in the "Safe" position thereof to prevent spurious operation of the system as may otherwise occur during the abnormal maneuvering of the vessel. However, when the attendant detects the launching or propulsion of a torpedo by signals received on the loud speaker 542, Fig. 1, he observes the condition of the electric eye and having noted that the electric eye signal is satisfactory, he moves the detonator switches DS of both control mechanisms into the "Arm" position thereby arming the system. As the approaching torpedo, indicated by the numeral 557, Fig. 32, moves into the response zone 149 of the acoustic streamer 12, the underwater sound developed by the torpedo within the water is picked up and electrically reproduced by the microphone units of the acoustic streamer.

The electrical signal received from the acoustic streamer is amplified in tubes 256, 274, and 305 of the electronic circuit, and the automatic gain control circuit thereof immediately acts to level the signal in proportion to the strength thereof, the signal retaining its incremental shape regardless of the leveling action. In the meantime, the squelch circuit operates to open the gate of dual control tube 283 whereupon the signal is further amplified in tubes 283 and 353 without substantial loss of the incremental shape thereof.

The signal next passes through the detection stage of tube 364 and the envelope of the signal appears in the discriminator circuit wherein the signal is analyzed for amplitude, incremental shape, and modulation. If each of these properties is of a predetermined quality indicative of a torpedo, the discriminator circuit operates to fire the trigger tube 404, the maximum peak of the signal occurring as the torpedo's propellers pass through the vertical plane of the detection stream 12 and the trigger tube 404 fires at approximately seven tenths of the maximum peak value of the signal which occurs substantially when the torpedo moves into the dashed line position 558.

Firing of the trigger tube actuates the relay R which in turn actuates the starting magnet M thus permitting rotation of the stop wheel of distributor D. After a time delay correspondnig to the time of travel of the torpedo from dashed line position 558 to a dashed line position 559 thereof, switch S3 is actuated by the distributor and thereby closes the circuit for firing the detonator ID of the inboard explosive streamer 10. The stop wheel now moves into position 4 thereby to stand by in readiness for further actuation of the control mechanism and firing of the outboard explosive streamer 11 in the event that a second torpedo passes the same acoustic streamer. It will be noted that the position 559 of the torpedo is disposed adjacent to and somewhat in advance of the explosive streamer 10 thereby to insure deflection or destruction of the torpedo before the torpedo has moved past the explosive streamer.

Subsequent firing of the trigger tube 404 caused by the transit of a second torpedo with respect to the same acoustic streamer 12 substantially instantly fires the detonator OD of the outboard explosive streamer 11, the detonation occurring when the torpedo moves into the dashed line position 558, which position bears substantially the same spaced relation with respect to the explosive streamer 11 as position 559 bears with relation to explosive streamer 10. Accordingly, the second torpedo is effectively destroyed, disabled, or deflected by the explosive streamer 11. In case of necessity, each of the detonators AD, ID, OD of the acoustic, inboard, and outboard explosive streamers respectively may be manually and selectively detonated at will by manipulation of the transfer switch TS with respect to the "Destroy" position thereof upon removal of the stop pin 462.

While the invention has been described with reference to but a single embodiment thereof which gives satisfactory results, it will be obvious to those skilled in the art to which the invention appertains, after understanding the invention, that the same is susceptible of additional embodiments, modifications, and variations thereof without departing from the spirit and scope of the invention as defined by the appended claims.

The invention herein described and claimed may be manufactured and used by or for the Government of the United States of America for governmental purposes without payment of any royalties thereon or therefor.

What is claimed as new and desired to be secured by Letters Patent of the United States is:

1. In a system of the character disclosed, the combination of a plurality of destroying means, each of which is adapted to destroy an automotive device and arranged in spaced relation within the path of travel thereof, a plurality of control circuit for each of said plurality of destroying means respectively, each one of said circuits including a normally open switch, a distributor device including a starting magnet and adapted to close each of said switches momentarily in predetermined sequence as the distributor operates, said magnet normally preventing operation of the distributor, distributor operating means, and means responsive to a signal received from said automotive device for controlling the operation of said starting magnet.

2. In a system of the character disclosed, the combination of a plurailty of electroresponsive devices for destroying an automotive device and arranged in spaced relation within the path of travel thereof, a common source of power for said plurality of electroresponsive destroying devices, switch means having a plurality of switching elements thereon, a plurality of control circuits respectively connected to said switching elements, each of said control circuits being aadpted to connect each one of said plurality of destroying devices selectively to said source of power, a distributor device adapted to actuate each of said switching elements momentarily and energize said electroresponsive devices in predetermined sequence as the distributor operates, distributor operating means, a starting magnet forming a part of said distributor device for normally preventing the operation of the distributor, circuit means including said switching elements for short-circuiting each of said electroresponsive devices except when the electroresponsive means are momentarily energized, and means responsive to a signal received from the automotive device for controlling the operation of the starting magnet.

3. In a system of the character disclosed, the combination of a plurality of means for destroying an automotive device, a normally inactive distributor device including a plurality of switch elements, a starting magnet for controlling the operation of said distributor device, distributor operating means, a plurality of control circuits connected to each of said plurality of destroying means respectively, each of said control circuits including at least one of said switch elements, means on said distributor device for closing momentarily each of said plurality of control circuits in predetermined sequence as the distributor device operates, and manipulative means for controlling at will the operation of said starting magnet.

4. In a system of the character disclosed, the combination of a plurality of means for destroying an automotive device, a manually operable multi-position switch device, a normally inactive distributor having means for selectively operating the destroying means as the distributor operates, distributor operating means, a starting magnet for said distributor, means responsive to a signal received from the automotive device for controlling the operation of said starting magnet selectively in accordance with the instant position of the automotive device during the travel thereof when said multi-position switch device is set to one of the multi-positions thereof, a second manually operable multi-position switch device adapted to operate said starting magnet independently of said signal responsive means, and means on said first named switch device for rendering said second switch device ineffective to operate said starting magnet when the first named switch device is set to said one of said multi-positions and the second switch device is moved to another of said multi-positions.

5. In a system for the protection of a vessel against torpedo attack, means arranged within the path of travel of a torpedo for detecting a sound signal having variations therein received from the torpedo and adapted to generate variable control voltages respectively proportional thereto, control means operatively connected to said voltage generating means including a device having a voltage thereon which voltage is adapted to follow substantially said signal in time delayed relation with respect thereto, an explosive charge disposed behind the detecting means in the path of travel of the torpedo whereby said control voltages may be maintained on said device for a period of time corresponding to the time of travel of the torpedo between said explosive charge and said detecting means, means for firing said explosive charge, and means including said device adapted to operate the firing means independently of the average value of the variations in the declining portion of said sound signal.

6. In a system for the protection of a vessel against torpedo attack, an explosive charge arranged within the water in the path of travel of a torpedo directed against the vessel, electroresponsive means including a first device having a voltage thereon adapted to vary in value substantially in accordance with the average value of the variations in an underwater sound signal received from the moving torpedo, a second device having a voltage thereon adapted to vary in value in accordance with the average value of said sound variations and in delayed time relation with respect to the voltage on said first voltage bearing device, and means controlled by a predetermined increase in the voltage of said second voltage bearing device over the voltage of said first voltage bearing device for firing said charge in predetermined timed relation to the occurrence of said increase of voltage.

7. In a system for the protection of a vessel against torpedo attack, an explosive charge arranged within the water in the path of travel of a torpedo directed against the vessel, electrical means including a first device having a voltage thereon adapted to vary in value substantially in proportion to the peak values of the variations in an underwater sound signal produced by the torpedo moving through the water, a second device having a voltage thereon adapted to vary in value substantially in proportion to the average value of said sound variations and in delayed time relation with respect to the variation in voltage on said first voltage bearing device, a third device having a voltage thereon adapted to vary substantially in proportion to the variations in said signal, means for adding the voltages on said second and third voltage bearing devices, and means responsive to a predominance of the sum of the voltages on said second and third voltage bearing devices over the voltage on the first voltage bearing device for firing said charge in predetermined timed relation to the occurrence of said predominating voltages.

8. A signal responsive control circuit of the character disclosed comprising, in combination, trigger means, a band pass amplifier adapted to amplify an amplitude modulated transient signal envelope having frequency components within a predetermined frequency range, rectifying means for isolating the envelope of the amplified signal envelope, a discriminator circuit adapted to analyze a predetermined time rate of increase in signal amplitude, and thereafter follow a predetermined rate of decay in incremental shape, and means responsive to the presence of amplitude modulation characteristics of said envelope to additively render the discriminator effective to operate said trigger means when each of said amplitude, incremental shape, and accompanying modulation characteristics is of predetermined quality.

9. A control circuit of the character disclosed adapted to operate in response to an amplitude modulated transient signal of predetermined character and of relatively long duration applied thereto comprising, in combination, trigger means, means for amplifying said signal, means responsive to signal amplification for interposing a predetermined time delay in the subsequent amplification of said signal thereby to prevent complete amplification of other signals of relatively short duration, and a discriminator circuit responsive only to signals passed by the time delay means and subsequently amplified by the amplifying means and adapted to operate said trigger means when the amplified signal possesses the characteristics of predetermined amplitude, incremental shape, and amplitude modulation.

10. A control circuit of the character disclosed adapted to operate in response to an amplitude modulated transient signal of predetermined character applied thereto comprising, in combination, trigger means, means for amplifying the signal wherein initial amplification, time delay, and subsequent final amplification are applied thereto, means for leveling said signal in proportion to the strength thereof without effectively impairing the incremental shape of the signal, and a discriminator circuit responsive to at least two characteristics of the incremental shape of the leveled signal and adapted to operate said trigger means when the leveled signal is ascertained to possess the predetermined characteristics of amplitude and time function, incremental shape, and amplitude modulation.

11. A control circuit of the character disclosed adapted to operate in response to an amplitude modulated transient signal of predetermined character applied thereto comprising, in combination, trigger means, means for leveling said signal in proportion to the strength thereof without effectively impairing the incremental shape of the signal, electroresponsive means for visually indicating the instant level of the signal, and a discriminator circuit responsive to the leveled signal and adapted to operate said trigger means after the leveled signal as displayed has been determined to possess predetermined qualities of predetermined amplitude and time function, incremental shape, and amplitude modulation.

12. A control circuit of the character disclosed adapted to operate in response to an amplitude modulated transient signal of predetermined character and of relatively long duration applied thereto comprising, in combination, trigger means, means for amplifying the signal, means for interposing a predetermined delay in the amplification of the signal thereby to prevent complete amplification of signals of other than predetermined desired amplitude-time characteristics and thus discriminate against other signals of relatively short duration, means for levelling the signal in proportion to the strength thereof without effectively impairing the incremental shape of the signal, electroresponsive means for visually indicating the instant level of the signal, and a discriminator circuit responsive to the leveled signal and adapted to operate said trigger means when the leveled signal is characterized by a predetermined amplitude time function, incremental shape, and amplitude modulation.

13. A signal responsive control mechanism of the character disclosed comprising, in combination, a normally inactive distributor device adapted to select in successsion a plurality of firing circuits to be controlled by the mechanism, distributor operating means, a starting magnet for controlling the operation of the distributor device, a relay for controlling the operation of the starting magnet, an electroresponsive device for controlling the operation of said relay, a signal responsive circuit including said electroresponsive device and comprising a band pass amplifier for amplifying a signal applied thereto, a squelch circuit for interposing a predetermined time delay in the amplification of the signal, an automatic signal gain control circuit adapted to level the signal in proportion to the strength thereof without effectively impairing the incremental shape of the signal, and a discriminator circuit critically responsive to a leveled signal of predetermined character and adapted to operate said electroresponsive device when the leveled signal is of said predetermined character.

14. A signal responsive control circuit of the character disclosed comprising, in combination, trigger means having elements thereof responsive to a predetermined differential in the potentials respectively applied thereto, a first means responsive to a predetermined input signal for applying a pulse having predetermined characteristics of increase and decay to one element, a second means responsive to said predetermined input signal for applying a pulse having predetermined increase and decay characteristics of different value to that applied by said first means to a second element of said trigger means and in time delayed relationship to the first pulse thereby to provide a predetermined differential in potential across said elements and of predetermined polarity for firing the trigger tube in response to said predetermined input signal.

15. The subject matter of claim 14 further characterized by the addition in combination therewith of a diode circuit means responsive to said input signal and connected to effectively alter the potential of the pulse applied by said one element to said trigger means for compensating for potential level cancelling effects due to the presence of amplitude modulation in said signal.

16. The combination of claim 14, further characterized by the inclusion in the circuit combination thereof of an input circuit therefor of a character comprised of a band pass amplifier and filter circuit capable of providing a first partial signal amplification of an input signal and a final signal amplification thereof, means for rendering said final amplification responsive to said partial amplification in a manner whereby it is contingent upon a predetermined time amplitude function characteristic of the input signal, and means operative in response to application thereto of said partially amplified signal for controlling the final amplification of the input signal for presentation to the trigger means in response to a predetermined time amplitude characteristic of the said input signal.

17. A signal responsive control circuit of the character disclosed comprising, in combination, a band pass amplifier capable of providing a first partial signal amplification of an input signal possessing predetermined characteristics and a final signal amplification thereof, said final amplification being contingent on reception of a predetermined time amplitude function characteristic of the signal, means operative in response to application thereto of said partially amplified signal for controlling the final amplification of the signal, discriminator circuit means in said circuit adapted for presentation thereto of the completely amplified signal, trigger tube means having elements thereof responsive to a predetermined differential in the potential applied respectively thereto, a first means of said discriminator being responsive to a completely amplified signal of predetermined character for applying a pulse having predetermined characteristics of increase and decay to one element of said trigger means, a second signal responsive means of said discriminator for applying a pulse having predetermined increase and decay characteristics and of different value to that applied to a first trigger tube element by said first means to a second element thereof and in time delayed relationship to the first named pulse, thereby to render the tube active in response to the predetermined differential in potentials of predetermined polarity applied thereacross for firing the trigger tube in response to a predetermined desired signal characteristic.

18. A signal responsive control circuit of the character disclosed comprising, in combination, a band pass amplifier capable of providing a first partial signal amplification of an input signal possessing predetermined characteristics and a final signal amplification thereof, said final amplification being contingent on reception of a predetermined time amplitude function characteristic of the signal, means operative in response to application thereto of said partially amplified signal for controlling the final amplification of the signal, discriminator circuit means in said circuit adapted for presentation thereto of the completely amplified signal, trigger tube means having elements thereof responsive to a predetermined differential in the potential applied respectively thereto, a first means of said discriminator being responsive to a completely amplified signal of predetermined character for applying a pulse having predetermined characteristics of increase and decay to one element of said trigger means, a second signal responsive means of said discriminator for applying a pulse having predetermined increase and decay characteristics and of different value to that applied to a first trigger tube element by said first means to a second element thereof and in time delayed relationship to the first named pulse, thereby to render the tube active when the pulse applied by the second means exceeds that applied by the first means.

19. The subject matter of claim 18 further characterized by the addition in combination therewith of a diode tube and circuit means responsive to said input signal and connected to effectively alter the potential of the pulse applied by said one element to said trigger tube means for compensating for the presence of amplitude modulation in said input signal and for applying a compensating potential in addition with the average signal applied to said second one of said trigger tube elements.

20. A signal responsive control circuit of the character disclosed comprising in combination means for applying an additive control signal of predetermined polarity in the presence of amplitude modulation in an input signal, trigger means having elements thereof responsive to a predetermined differential in the potentials applied respectively thereto, a first means responsive to an applied signal for applying pulses of predetermined increase and decay characteristics to a first one of said elements, a second signal repsonsive means for applying a pulse differing in increase and decay characteristics from the pulse applied to said first element to the second element of the trigger means and in time delay relationship thereto, and means for applying the additive output potential of said first named means to one of said elements of the trigger means.

21. A signal responsive control circuit of the character disclosed comprising, in combination, trigger means having elements thereof responsive to a predetermined differential in the potentials respectfully applied thereto, a first means responsive to an input signal having predetermined characteristics for applying a pulse having characteristics of increase and decay correlative with said input signal characteristics to one element, a second means responsive to said predetermined input signal for applying a pulse having increase and decay characteristics correlative with said input signal characteristics and of a different value to that applied by said first means to a second element of said trigger means and in time delay relationship to the first pulse thereby to provide a predetermined differential in potential across said elements and of predetermined polarity for firing the trigger tube in response to said predetermined input signal.

22. The subject matter of claim 21 further characterized by the addition in combination therewith of tube and circuit means for applying an additive potential of a predetermined polarity to one of said element correlative with the presence of amplitude modulation in said input signal.

23. The combination of claim 22, further characterized by the inclusion in the circuit combination thereof of an input circuit therefor of a character comprised of an amplifier and a band pass filter circuit capable of providing a first partial signal amplification of said input signal having predetermined characteristics and a final signal amplification thereof, means for rendering said final amplification responsive to said partial amplification in a manner whereby it is contingent upon a predetermined characteristic of the input signal, and means operative in response to application thereto of said partially amplified signal for controlling the final amplification of the signal for presentation to the trigger means in response to predetermined characteristics of said signal.

References Cited in the file of this patent
UNITED STATES PATENTS

| 1,698,770 | Ohl | Jan. 15, 1929 |
| 1,901,185 | Nelson | Mar. 14, 1933 |
| 2,173,154 | Bernard | Sept. 19, 1939 |
| 2,198,901 | Boswau | Apr. 30, 1940 |
| 2,263,932 | Schnoll | Nov. 25, 1941 |
| 2,275,930 | Torcheux | Mar. 10, 1942 |
| 2,339,198 | Smith | Jan. 11, 1944 |
| 2,400,259 | Place | May 14, 1946 |
| 2,404,440 | Holm | July 23, 1946 |
| 2,415,654 | Place | Feb. 11, 1947 |
| 2,668,512 | Klas | Feb. 9, 1954 |